US008414378B2

(12) United States Patent
Okada et al.

(10) Patent No.: US 8,414,378 B2
(45) Date of Patent: Apr. 9, 2013

(54) GAMING MACHINE AND CONTROL METHOD THEREOF

(75) Inventors: Kazuo Okada, Koto-ku (JP); Kenta Sugano, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 244 days.

(21) Appl. No.: 12/788,846

(22) Filed: May 27, 2010

(65) Prior Publication Data

US 2010/0304835 A1 Dec. 2, 2010

(30) Foreign Application Priority Data

Jun. 1, 2009 (JP) ................................ 2009-132349

(51) Int. Cl.
*G06F 17/00* (2006.01)

(52) U.S. Cl.
USPC ............................................. 463/20; 463/16

(58) Field of Classification Search ............... 463/16–20
See application file for complete search history.

(56) References Cited

U.S. PATENT DOCUMENTS 4,283,709 A 8/1981 Lucero et al.
4,624,459 A 11/1986 Kaufman
4,669,731 A 6/1987 Clarke
4,837,728 A 6/1989 Barrie et al.
4,964,638 A 10/1990 Ishida
5,178,390 A 1/1993 Okada
5,280,909 A 1/1994 Tracy
5,564,700 A 10/1996 Celona
5,611,730 A 3/1997 Weiss
5,639,088 A 6/1997 Schneider et al.
5,695,402 A 12/1997 Stupak
5,702,303 A 12/1997 Takemoto et al.
5,770,533 A 6/1998 Franchi
5,820,459 A 10/1998 Acres et al.
5,836,817 A 11/1998 Acres et al.
5,890,963 A 4/1999 Yen
5,910,048 A 6/1999 Feinberg
6,001,016 A 12/1999 Walker et al.

(Continued)

FOREIGN PATENT DOCUMENTS

DE 32 42 890 A1 5/1984
DE 37 12 841 A1 11/1988

(Continued)

*Primary Examiner* — Michael Cuff
(74) *Attorney, Agent, or Firm* — Edwards Wildman Palmer LLP

(57) ABSTRACT

A gaming machine according to the present invention comprises a display on which plural types of symbols are to be arranged; a memory for storing an accumulative value, which is accumulated by unit game to activate a plurality of insurance pays and has a first threshold value and a second threshold value, and a plurality of payout value of the insurance pays, which is stored in associated with the first threshold value and the second threshold value of the accumulative value; and a controller. Where the accumulative value accumulated by unit game in which the plural types of symbols are rearranged on the display has reached the first threshold value, a first insurance pay is activated in accordance with a payout value associated with the first threshold value. The accumulative value is further counted in such each unit game. Where the counted accumulative value has reached the second threshold value, processing is performed as to activating a second insurance pay in accordance with a payout value associated with the second threshold value.

3 Claims, 36 Drawing Sheets

First payout value table for insurance

| Random number value | 0 | 1 | 2 | 3 |
|---|---|---|---|---|
| First payout value | 300 | 400 | 500 | 600 |

U.S. PATENT DOCUMENTS

| | | | | |
|---|---|---|---|---|
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,604,999 | B2 | 8/2003 | Ainsworth | |
| 6,695,697 | B1 | 2/2004 | Okada | |
| 6,932,704 | B2 | 8/2005 | Walker et al. | |
| 6,932,707 | B2 | 8/2005 | Duhamel | |
| 7,568,973 | B2 * | 8/2009 | Iddings et al. | 463/25 |
| 7,871,323 | B2 * | 1/2011 | Walker et al. | 463/16 |
| 7,887,410 | B2 * | 2/2011 | Okada | 463/20 |
| 7,976,383 | B2 * | 7/2011 | Fujimoto et al. | 463/25 |
| 8,088,001 | B2 * | 1/2012 | Preisach | 463/25 |
| 2002/0065124 | A1 | 5/2002 | Ainsworth | |
| 2003/0069073 | A1 | 4/2003 | Okada | |
| 2004/0053676 | A1 | 3/2004 | Rodgers | |
| 2005/0143159 | A1 * | 6/2005 | Kaminkow et al. | 463/16 |
| 2006/0025207 | A1 * | 2/2006 | Walker et al. | 463/25 |
| 2007/0293308 | A1 * | 12/2007 | Jackson et al. | 463/25 |
| 2008/0139287 | A1 | 6/2008 | Okada | |
| 2008/0248867 | A1 * | 10/2008 | Englman et al. | 463/25 |
| 2009/0011827 | A1 * | 1/2009 | Englman et al. | 463/27 |
| 2009/0227376 | A1 * | 9/2009 | Oomori | 463/41 |
| 2009/0325676 | A1 * | 12/2009 | Inamura | 463/20 |
| 2010/0056255 | A1 * | 3/2010 | Yoshizawa | 463/20 |
| 2010/0234089 | A1 * | 9/2010 | Saffari et al. | 463/20 |
| 2011/0244944 | A1 * | 10/2011 | Baerlocher | 463/20 |

FOREIGN PATENT DOCUMENTS

| | | | |
|---|---|---|---|
| DE | 41 37 010 | A1 | 8/1992 |
| DE | 100 49 444 | A1 | 11/2001 |
| EP | 0 631 798 | A1 | 1/1995 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | | 1/1999 |
| JP | 2003-117053 | | 4/2003 |
| WO | WO 03/083795 | A1 | 10/2003 |
| WO | WO 2004/095383 | A1 | 11/2004 |
| WO | WO 2007/026396 | A1 | 3/2007 |
| WO | WO 2007/026399 | A1 | 3/2007 |
| WO | WO 2007/026400 | A1 | 3/2007 |
| WO | WO 2007/026401 | A1 | 3/2007 |
| WO | WO 2007/026402 | A1 | 3/2007 |
| WO | WO 2007/026403 | A1 | 3/2007 |
| WO | WO 2007/026404 | A1 | 3/2007 |
| WO | WO 2007/026406 | A1 | 3/2007 |
| WO | WO 2007/026407 | A1 | 3/2007 |

* cited by examiner

FIG. 2A

First payout value table for insurance

| Random number value | 0 | 1 | 2 | 3 |
|---|---|---|---|---|
| First payout value | 300 | 400 | 500 | 600 |

FIG. 2B

Second payout value table for insurance

| Random number value | 0 | 1 | 2 | 3 |
|---|---|---|---|---|
| Second payout value | 1000 | 1200 | 1400 | 1600 |

FIG. 6

Symbol arrangement table

| Code No. | Symbol | Symbol | Symbol | Symbol | Symbol |
|---|---|---|---|---|---|
| 00 | A | K | Q | J | 8 |
| 01 | 2 | A | K | Q | J |
| 02 | 3 | 2 | A | K | Q |
| 03 | 4 | 3 | 2 | A | K |
| 04 | 5 | 4 | 3 | 2 | A |
| 05 | 6 | 5 | 4 | 3 | 2 |
| 06 | 7 | 6 | 5 | 4 | 3 |
| 07 | 8 | 7 | 6 | 5 | 4 |
| 08 | J | 8 | 7 | 6 | 5 |
| 09 | Q | J | 8 | 7 | 6 |
| 10 | K | Q | J | 8 | 7 |
| 11 | A | K | Q | J | 8 |
| 12 | 2 | A | K | Q | J |
| 13 | 3 | 2 | A | K | Q |
| 14 | 4 | 3 | 2 | A | K |
| 15 | 5 | 4 | 3 | 2 | A |
| 16 | 6 | 5 | 4 | 3 | 2 |
| 17 | 7 | 6 | 5 | 4 | 3 |
| 18 | 8 | 7 | 6 | 5 | 4 |
| 19 | J | 8 | 7 | 6 | 5 |
| 20 | Q | J | 8 | 7 | 6 |
| 21 | K | Q | J | 8 | 7 |

FIG. 7

Prize payment table

| Symbol | Number of symbols rearranged on pay-line | | |
|---|---|---|---|
| | Three | Four | Five |
| 2 | 2 | 4 | 6 |
| 3 | 4 | 8 | 12 |
| 4 | 6 | 12 | 18 |
| 5 | 8 | 16 | 24 |
| 6 | 10 | 20 | 30 |
| 7 | 20 | 40 | 60 |
| 8 | 40 | 80 | 120 |
| J | 50 | 100 | 200 |
| Q | 70 | 140 | 280 |
| K | Combination for free-game execution | | |
| A | Combination for jackpot execution | | |

FIG. 8A

First payout value table for insurance

| Random number value | 0 | 1 | 2 | 3 |
|---|---|---|---|---|
| First payout value | 300 | 400 | 500 | 600 |

FIG. 8B

Second payout value table for insurance

| Random number value | 0 | 1 | 2 | 3 |
|---|---|---|---|---|
| Second payout value | 1000 | 1200 | 1400 | 1600 |

FIG.22

| | Payout value |
|---|---|
| Insurance for free game | 100 |

FIG.23

| | Number of times of activating insurance | Threshold value (number of times of playing insurance-effective game) | Payout value |
|---|---|---|---|
| First insurance | 1 | 400 | 300 |
| Second insurance | 2 | 500 | 350 |
| Third insurance | 3 | 600 | 400 |
| Fourth insurance | 4 | 700 | 500 |

FIG.25

| First stage | |
|---|---|
| Winning combination for RESCUE | Free Game |
| Number of games leading up to payout of first insurance | 650 |
| Payout value of first insurance (basic payment for Credit) | 250 |
| More "Wild" symbols are added in Free Game for payout of insurance. / Reel position | 1,2,3 |
| Number of free games | 7 |

| Second stage | |
|---|---|
| Winning combination for RESCUE | Free Game |
| Number of games leading up to payout of second insurance | 1～400 |
| Payout value of second insurance (basic payment for Credit) | 1000 |
| More "Wild" symbols are added in Free Game for payout of insurance. / Reel position | 1,2,3,4,5 |
| Number of free games | 7 |

FIG.33
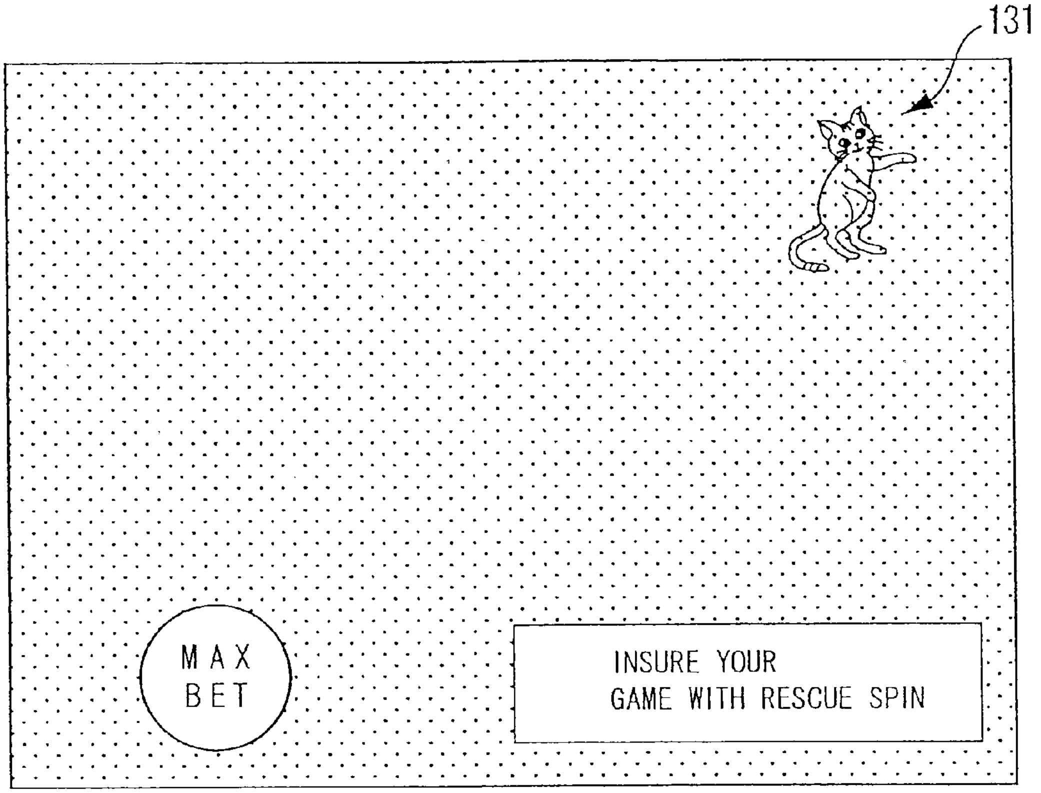
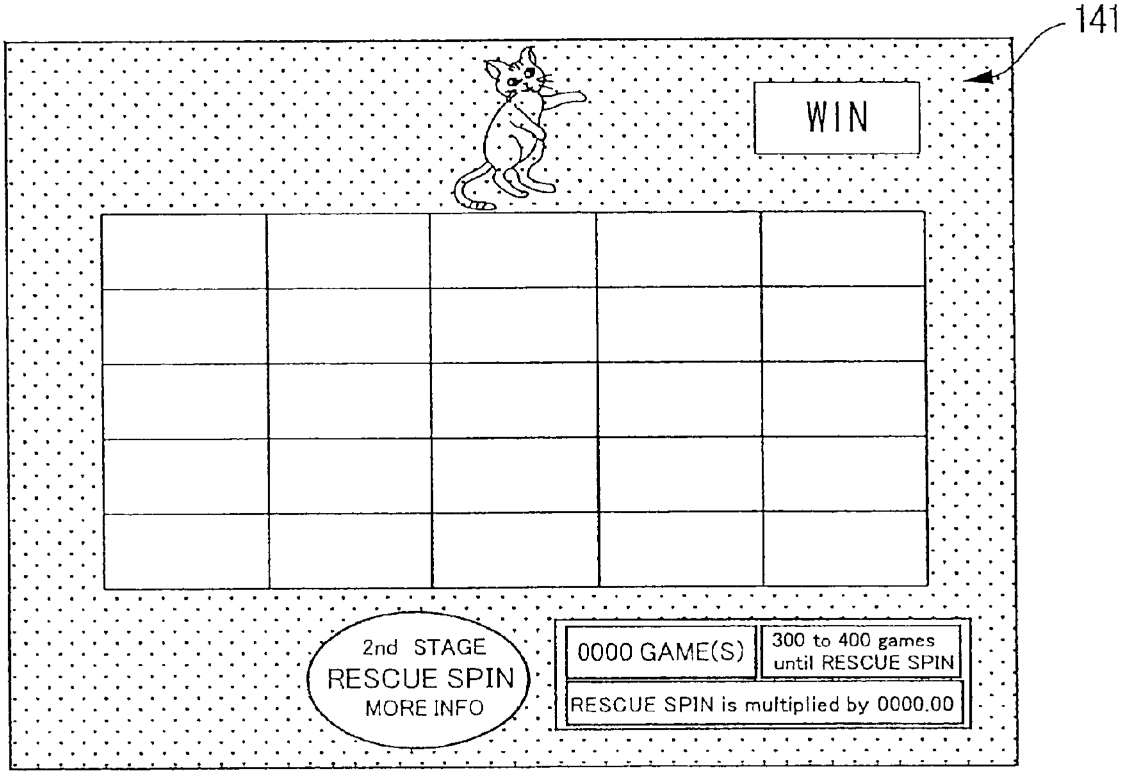

FIG.34A

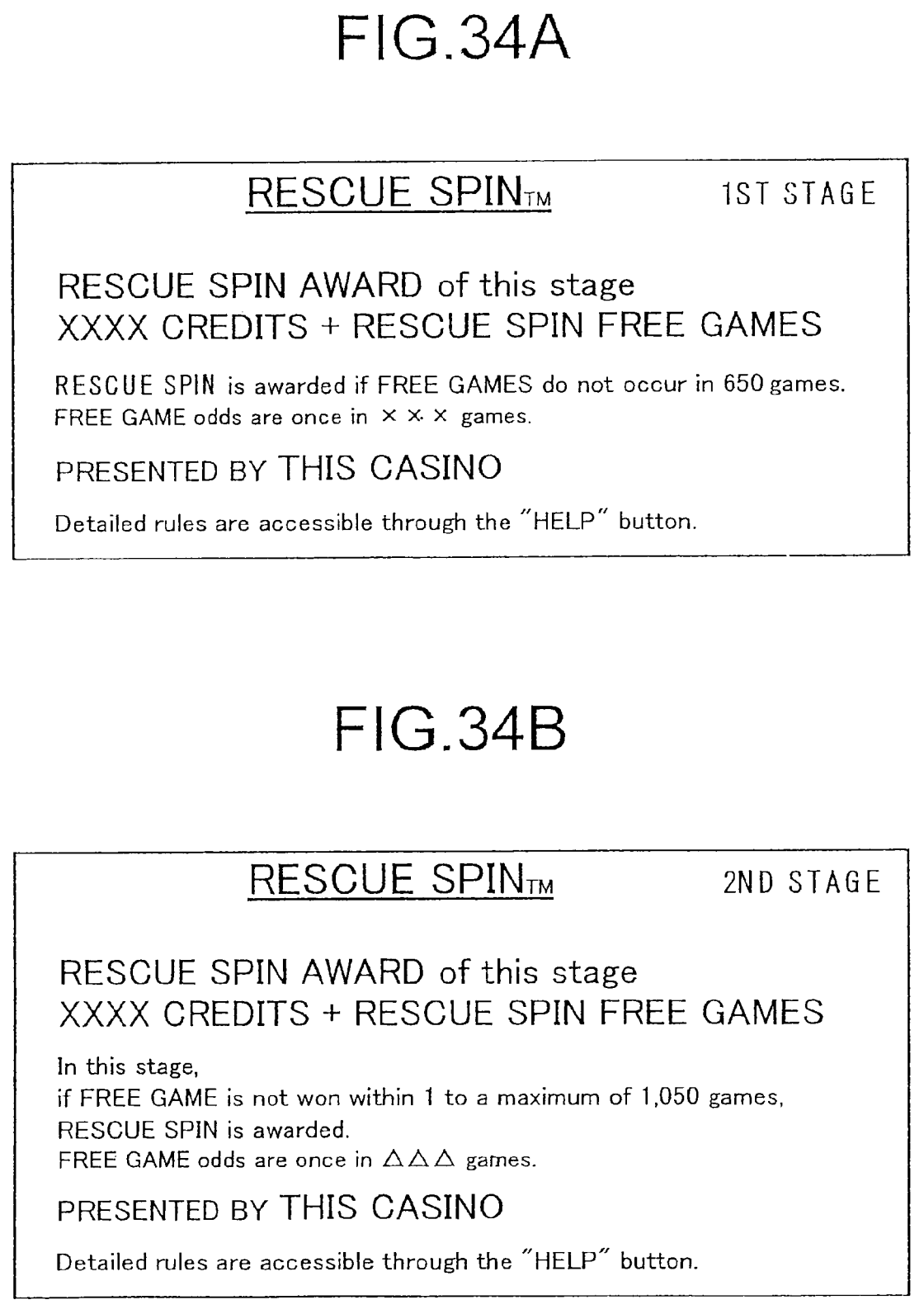

RESCUE SPIN™ 1ST STAGE

RESCUE SPIN AWARD of this stage
XXXX CREDITS + RESCUE SPIN FREE GAMES

RESCUE SPIN is awarded if FREE GAMES do not occur in 650 games.
FREE GAME odds are once in × × × games.

PRESENTED BY THIS CASINO

Detailed rules are accessible through the "HELP" button.

FIG.34B

RESCUE SPIN™ 2ND STAGE

RESCUE SPIN AWARD of this stage
XXXX CREDITS + RESCUE SPIN FREE GAMES

In this stage,
if FREE GAME is not won within 1 to a maximum of 1,050 games,
RESCUE SPIN is awarded.
FREE GAME odds are once in △△△ games.

PRESENTED BY THIS CASINO

Detailed rules are accessible through the "HELP" button.

FIG.36

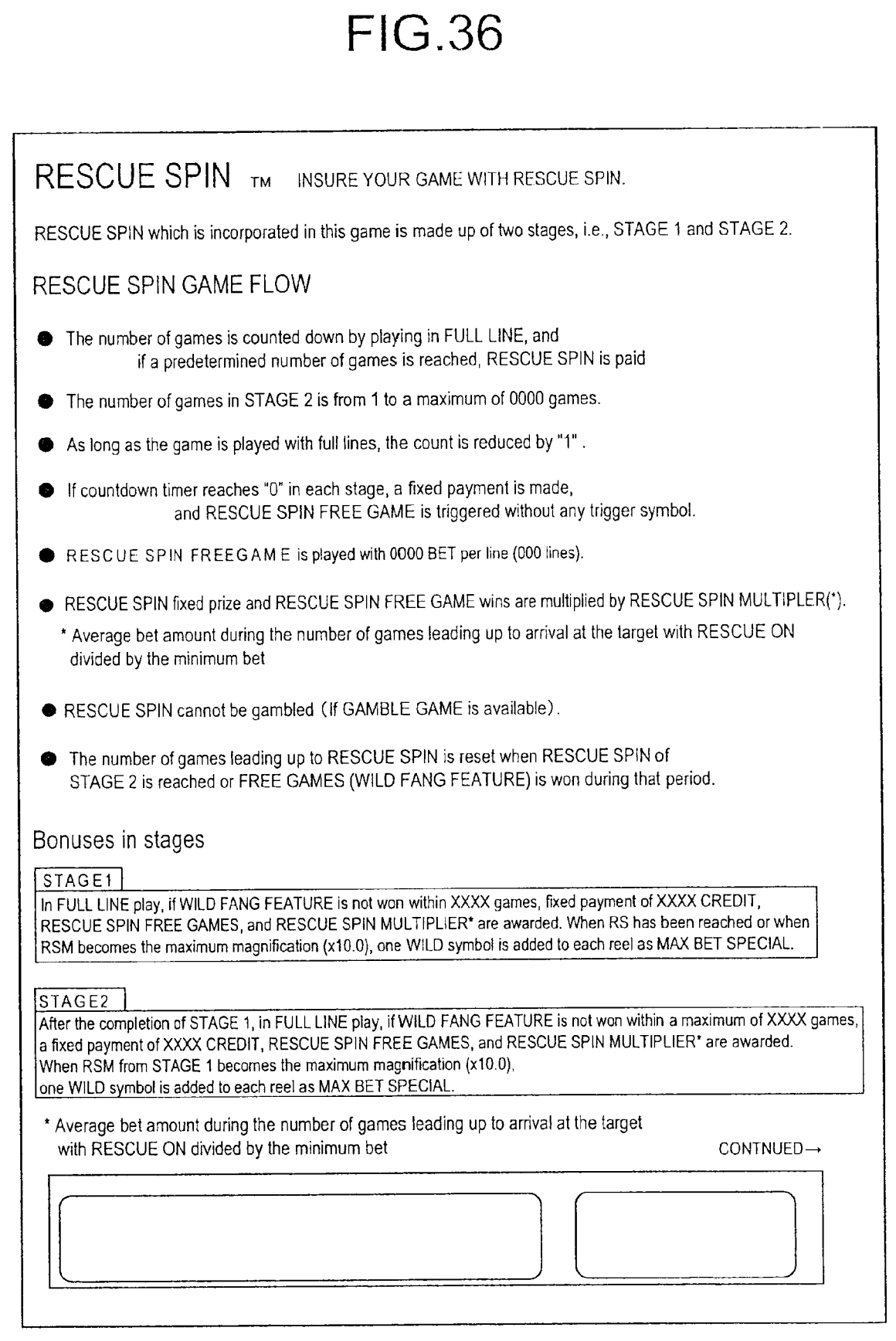

RESCUE SPIN ™ INSURE YOUR GAME WITH RESCUE SPIN.

RESCUE SPIN which is incorporated in this game is made up of two stages, i.e., STAGE 1 and STAGE 2.

RESCUE SPIN GAME FLOW

- The number of games is counted down by playing in FULL LINE, and if a predetermined number of games is reached, RESCUE SPIN is paid
- The number of games in STAGE 2 is from 1 to a maximum of 0000 games.
- As long as the game is played with full lines, the count is reduced by "1".
- If countdown timer reaches "0" in each stage, a fixed payment is made, and RESCUE SPIN FREE GAME is triggered without any trigger symbol.
- RESCUE SPIN FREEGAME is played with 0000 BET per line (000 lines).
- RESCUE SPIN fixed prize and RESCUE SPIN FREE GAME wins are multiplied by RESCUE SPIN MULTIPLER(*).
  * Average bet amount during the number of games leading up to arrival at the target with RESCUE ON divided by the minimum bet
- RESCUE SPIN cannot be gambled (If GAMBLE GAME is available).
- The number of games leading up to RESCUE SPIN is reset when RESCUE SPIN of STAGE 2 is reached or FREE GAMES (WILD FANG FEATURE) is won during that period.

Bonuses in stages

STAGE1

In FULL LINE play, if WILD FANG FEATURE is not won within XXXX games, fixed payment of XXXX CREDIT, RESCUE SPIN FREE GAMES, and RESCUE SPIN MULTIPLIER* are awarded. When RS has been reached or when RSM becomes the maximum magnification (x10.0), one WILD symbol is added to each reel as MAX BET SPECIAL.

STAGE2

After the completion of STAGE 1, in FULL LINE play, if WILD FANG FEATURE is not won within a maximum of XXXX games, a fixed payment of XXXX CREDIT, RESCUE SPIN FREE GAMES, and RESCUE SPIN MULTIPLIER* are awarded. When RSM from STAGE 1 becomes the maximum magnification (x10.0), one WILD symbol is added to each reel as MAX BET SPECIAL.

* Average bet amount during the number of games leading up to arrival at the target with RESCUE ON divided by the minimum bet

CONTNUED→

GAMING MACHINE AND CONTROL METHOD THEREOF

CROSS-REFERENCE TO RELATED APPLICATIONS

This application is based on and claims a priority from the prior Japanese Patent Application No. 2009-132349 filed on Jun. 1, 2009, the entire contents of which are incorporated herein by reference.

BACKGROUND OF THE INVENTION

1. Field of the Invention

The present invention relates to a gaming machine and a control method thereof, and more particularly, to a gaming machine and a control method thereof, allowing an amount of payout of insurance to vary according to the contents of games.

2. Description of the Related Art

Conventional gaming machines are known in which: a game is started by betting a predetermined amount of gaming media; a plurality of reels on which a plurality of symbols are drawn starts spinning; spinning of the plurality of reels is stopped after the elapse of a predetermined period of time; and a prize is awarded based on a combination of symbols appearing on reels displayed in a stopped state. Further, conventional gaming machines are known in which the payout of insurance is performed for players. In such gaming machines, in the case where a player has consumed a large number of gaming media after the play of a game for a long time, if games have been played until a predetermined number of games have been reached, the payout of a predetermined amount of insurance is performed for such player.

Examples of the prior art documents are: Japanese Patent Application Publication 2003-117053; United State Patent Application Publication No. 2008/139287; U.S. Pat. No. 6,604,999B2; United State Patent No. 2002065124A1; United State Patent No. 20040053676A1; U.S. Pat. No. 5,178,390; U.S. Pat. No. 5,820,459; U.S. Pat. No. 6,695,697; U.S. Pat. No. 6,254,483; U.S. Pat. No. 5,611,730; U.S. Pat. No. 5,639,088; U.S. Pat. No. 6,257,981; U.S. Pat. No. 6,234,896; U.S. Pat. No. 6,001,016; U.S. Pat. No. 6,273,820; U.S. Pat. No. 6,224,482; U.S. Pat. No. 4,669,731; U.S. Pat. No. 6,244,957; U.S. Pat. No. 5,910,048; U.S. Pat. No. 5,695,402; U.S. Pat. No. 6,003,013; U.S. Pat. No. 4,283,709; U.S. Pat. No. 4,964,638; U.S. Pat. No. 6,089,980; U.S. Pat. No. 5,280,909; U.S. Pat. No. 5,702,303; U.S. Pat. No. 6,270,409; U.S. Pat. No. 5,770,533; U.S. Pat. No. 5,836,817; U.S. Pat. No. 6,932,704; U.S. Pat. No. 6,932,707; U.S. Pat. No. 4,837,728; U.S. Pat. No. 4,624,459; U.S. Pat. No. 5,564,700; U.S. Pat. No. 5,890,963; United State Patent Application Publication No. 2003/0069073; European Patent Application Publication No. 1192975; European Patent Application Publication No. 1302914; European Patent Application Publication No. 1544811; European Patent Application Publication No. 1477947; European Patent Application Publication No. 1351180; European Patent Application Publication No. 0631798; German Patent Application Publication No. 4137010; German Patent Application Publication No. 3712841; German Patent Application Publication No. 3242890; German Patent Application Publication No. 10049444; United Kingdom Patent Application Publication No. 2326830; WO04/095383; WO03/083795; WO07/026396; WO07/026401; WO04/026400; WO07/026406; WO07/026399; WO07/026407; WO07/026402; WO07/026403; and WO07/026404.

In the game machines described above, the payout of insurance is not performed until a predetermined number of times of playing a game has been reached. Thus, if a player has abandoned continuing games until the predetermined number of times of playing the game has been reached, the player has also been forced to abandon acquisition of the insurance.

The present invention has been made in view of the above-described circumference, and aims to provide a gaming machine and a control method of the gaming machine having a new insurance function.

SUMMARY OF THE INVENTION

A gaming machine according to a first aspect of the present invention has the following configuration. That is, the gaming machine comprises:

a display on which plural types of symbols are to be arranged;

a memory for storing an accumulative value, which is accumulated by unit game to activate a plurality of insurance pays and has a first threshold value and a second threshold value, and a volume of a prize of the insurance pays, which is stored in associated with the first threshold value and the second threshold value of the accumulative value; and a controller, the controller being configured to execute the processing of:

(a) rearranging the plural types of symbols on the display;

(b) counting the accumulative value by said unit game and storing the counted accumulative value in the memory;

(c) determining whether the accumulative value stored in the memory has reached the first threshold value, as a result of repeating the processing (a) and (b);

(d) activating the first insurance pay in accordance with the volume of the prize stored in the memory in accordance with the first threshold value, in a case where it is determined that the accumulative value has reached the first threshold value, as a result of the determination of the processing (c);

(e) performing the processing (a);

(f) further counting the accumulative value by unit game, and then, storing the counted accumulative value in the memory;

(g) determining whether the accumulative value stored in the memory has reached the second threshold value, as a result of repeating the processing (e) and (f); and (h) activating the second insurance pay in accordance with the volume of the prize stored in the memory in association with the second threshold value, in a case where it is determined that the accumulative value has reached the second threshold value, as a result of the determination of the processing (g).

According to the first aspect of the present invention, a first insurance pay is activated before a condition for activating a second insurance pay is met, whereby a player can easily continue a game until the second insurance pay is activated. For example, the gaming machine of the present invention activates the first insurance pay when a 650-th game has completed, in the case where the number of games is employed as an accumulative value. The player can easily continue a game until the number of games (1,050 times) of activating the second insurance pay has been reached, by utilizing gaming values obtained by activation of the first insurance pay. In this manner, the profit of insurance can appropriately given the player.

The gaming machine according to a second aspect of the present invention is directed to that according to the first aspect, wherein the controller comprises the processing of: determining a value as the second threshold value; storing the determined value as the second threshold value in the memory; and executing the processing (g), based on the second threshold value stored in the memory.

The gaming machine according to a third aspect of the present invention is directed to that according to the first aspect, wherein the controller comprises the processing of:

determining whether the accumulative value has reached a predetermined value within the second threshold value, as a result of the processing (f); and executing a pre-echo effect of advance notice that the second insurance pay is activated by the accumulative value becoming close to the second threshold value, in a case where it is determined that the accumulative value has reached the predetermined value in the second threshold value as a result of the determination.

The gaming machine according to a fourth aspect of the present invention is directed to that according to the first aspect, wherein the volume of the prize is at least one of a payout amount of gaming values for each of the insurance pays and the number of free games for each of the insurance pays.

The gaming machine according to a fifth aspect of the present invention is directed to that according to the first aspect, wherein the accumulative value stored in the memory further has a third threshold value;

the volume of the prize stored in the memory has a volume of a prize stored in association with the third threshold value of the accumulative value; and the controller is further configured to execute the processing of:

(i) randomly determining a predetermined number of insurance pays from among the plurality of insurance pays;

(j) executing the processing (a) to (h);

(k) determining whether the determined predetermined number of insurance pays has been activated;

(l) executing the processing (a) in accordance with a result of the determination of the processing (k);

(m) further counting an accumulative value by unit game, and then, storing the counted accumulative value in the memory;

(n) determining whether the accumulative value stored in the memory has reached the third threshold value, as a result of repeating the processing (l) and (m); and (o) activating the third insurance pay in accordance with the volume of the prize stored in the memory in association with the third threshold value, in a case where it is determined that the accumulative value has reached the third threshold value, as a result of the determination of the processing (n).

According to the fifth aspect of the present invention, the number of times of activating insurance is randomly determined. Therefore, a variety of patterns for activating insurance can be provided, allowing a player to enhance expectation for the contents of activating insurance.

The gaming machine according to a sixth aspect of the present invention is directed to that according to the first aspect, further comprising a display portion for displaying the number of times of activating the plurality of insurance pays, wherein the controller is configured to further execute the processing of:

determining whether the number of times of activating the plurality of insurance pays is to be displayed at the display portion; and displaying the number of times of activating the plurality of insurance pays at the display portion in accordance with a result of the determination.

According to the sixth aspect of the present invention, it is randomly determined whether to enable/disable the display of the number of times of activating insurance. Therefore, a player is allowed to have expectation for the contents of activating insurance by recognizing the number of times of activating insurance, or alternatively, to have interest as to patterns for activating insurance by keeping the number of times of activating insurance secret.

The gaming machine according to a seventh aspect of the present invention is directed to that according to the first aspect, wherein the controller is configured to further execute the processing of:

randomly determining a volume of prizes of the plurality of insurance pays;

storing the determined volume of the prizes of the plurality of insurance pays in the memory; and executing a corresponding insurance pay in accordance with the volume of the prizes stored in the memory, during activation of each of the insurance pays.

According to the seventh aspect, the volume of the prizes of the plurality of insurance pays is randomly determined. Therefore, a player is allowed to have expectation as to an insurance pay to be paid out.

The gaming machine according to an eighth aspect of the present invention is directed to that according to the first aspect, wherein the volume of the plurality of prizes is stored in the memory in association with each of the insurance pays so as to increase in accordance with the number of times of activating the insurance pays.

According to the eighth aspect of the present invention, a player is allowed to award a profit of a small amount of insurance, prior to awarding a profit of a large amount of insurance. In this manner, the player can continue a game by utilizing the profit of the small amount of insurance, thus making it easy to continue a game until the large amount of insurance is obtained and making it easy to receive the profit of insurance.

The gaming machine according to a ninth aspect of the present invention is directed to that according to the first aspect, wherein the controller is configured to further execute the processing of:

(i) determining whether the symbols rearranged on the display form a winning combination or a predetermined number of symbols, as a result of repeating the processing (a) and (b);

(ii) in a case where it is determined that the symbols form a winning combination or a predetermined number of symbols, as a result of the determination of the processing (i), executing processing of awarding a special prize according to the winning combination or a predetermined number of symbols, resetting the accumulative value stored in the memory, and repeating the processing (a) and (b);

(iii) executing the processing (c) and (d), in a case where it is not determined that the symbols form a winning combination or a predetermined number of symbols, as a result of the determination of the processing (i);

(iv) determining whether the symbols rearranged on the display in the processing (e) form a winning combination or a predetermined number of symbols, as a result of repeating the processing (e) and (f);

(v) in a case where it is determined that the symbols form a winning combination or a predetermined number of symbols, as a result of the determination of the processing (iv), executing processing of awarding a special prize according to the winning combination or the predetermined number of symbols, resetting the accumulative value stored in the memory, and repeating the processing (a) and (b); and (vi) executing the processing (g) and (h), in a case where it is not determined that the symbols form a winning combination or a predetermined number of symbols, as a result of the determination of the processing (iv).

According to the ninth aspect of the present invention, in the case where a special prize has been obtained, an accumulative value associated with activation of an insurance pay is reset. In this manner, if a player has obtained a lot of profit, the payout of insurance is not performed, thus allowing fairness to be kept between players.

The gaming machine according to a tenth aspect of the present invention is directed to that according to the first aspect, wherein the memory further stores an insurance pay to be activated in accordance with a winning special prize; and the controller is configured to further execute the processing of:

(i) determining the symbols rearranged on the display in the processing (a) form a winning combination or a predetermined number of symbols, as a result of repeating the processing (a) and (b);

(ii) in a case where it is determined that the symbols form a winning combination or a predetermined number of symbols, as a result of the determination of the processing (i), executing processing of awarding a special prize according to the winning combination or the predetermined number of symbols and executing processing of activating the insurance pay stored in the memory in accordance with the winning special prize and the processing (c) and (d);

(iii) executing the processing (c) and (d) in a case where it is not determined that the symbols form a winning combination or a predetermined number of symbols, as a result of the determination of the processing (i);

(iv) determining whether the symbols rearranged on the display in the processing (e) form a winning combination or a predetermined number of symbols, as a result of repeating the processing (e) and (f);

(v) in a case where the symbols form a winning combination or a predetermined number of symbols, as a result of the determination of the processing (iv), executing processing of awarding a special prize according to the winning combination or the predetermined number of symbols and executing processing of activating the insurance pay stored in the memory in accordance with the winning special prize and the processing (g) and (h);

(vi) executing the processing (g) and (h), in a case where it is not determined that the symbols form a winning combination or the predetermined number of symbols, as a result of the determination of the processing (iv); and (vii) resetting the accumulative value stored in the memory after performing the processing (h).

According to the tenth aspect of the present invention, an insurance pay is made when a special prize is given a player as well. In addition, an accumulative value according to activation of the insurance pay is not reset according to a winning special prize. Thus, if a player performs a predetermined number of games, a profit of insurance is surely given. Therefore, the player is allowed to have a sense of expectation for insurance.

A gaming machine according to an eleventh aspect of the present invention comprises the following configuration. That is, the gaming machine comprises:

a display for displaying a game result;

a memory for storing an accumulative value, which is accumulated by unit game to activate a plurality of insurance pays and has a first threshold value and a second threshold value, and a volume of a prize of each of the insurance pays, which is stored in association with the first threshold value and the second threshold value of the accumulative value; and a controller, the controller being configured to execute the processing of:

(a) displaying a game result on the display;

(b) counting the accumulative value by unit game and storing the counted accumulative value in the memory;

(c) determining whether the accumulative value stored in the memory has reached the first threshold value, as a result of repeating the processing (a) and (b);

(d) activating the first insurance pay in accordance with the volume of the prize stored in the memory in association with the first threshold value, in a case where it is determined that the accumulative value has reached the first threshold value, as a result of the determination of the processing (c);

(e) performing the processing (a);

(f) further counting the accumulative value by said unit game and storing the counted accumulative value in the memory;

(g) determining whether the accumulative value stored in the memory has reached the second threshold value, as a result of repeating the processing (e) and (f); and (h) activating the second insurance pay in accordance with the volume of the prize stored in the memory in association with the second threshold value, in a case where it is determined that the accumulative value has reached the second threshold value, as a result of the determination of the processing (g).

According to the eleventh aspect of the present invention, a first insurance pay is activated before a condition for activating a second insurance pay is met, whereby a player can easily continue a game until the second insurance pay is activated. For example, the gaming machine of the present invention activates the first insurance pay when a 650-th game has completed, in a case where the number of games is employed as an accumulative value. The player can easily continue a game until the number of games (1,050 times) of activating the second insurance pay has been reached, by utilizing gaming values obtained by activation of the first insurance pay. In this manner, the profit of insurance can be appropriately given the player.

A gaming machine according to a twelfth aspect of the present invention is directed to that according to the eleventh aspect, wherein the accumulative value stored in the memory further has a third threshold value;

the volume of the prize stored in the memory has a volume of a prize stored in association with the third threshold value of the accumulative value the controller is further configured to execute the processing of:

(i) randomly determining a predetermined number of insurance pays from among the plurality of insurance pays;

(j) executing the processing (a) to (h);

(k) determining whether the determined predetermined number of insurance pays has been activated;

(l) executing the processing (a) in accordance with a result of the determination of the processing (k);

(m) further counting an accumulative value by unit game, and then, storing the counted accumulative value in the memory;

(n) determining whether the accumulative value stored in the memory has reached the third threshold value, as a result of repeating the processing (l) and (m); and (o) activating the third insurance pay in accordance with the volume of the prize stored in the memory in association with the third threshold value, in a case where it is determined that the accumulative value has reached the third threshold value, as a result of the determination of the processing (n).

According to the twelfth aspect of the present invention, the number of times of activating insurance is randomly determined. Therefore, a variety of patterns for activating insurance can be provided, allowing a player to enhance his or her expectation for the contents of activating insurance.

The gaming machine according to a thirteenth aspect of the present invention is directed to that according to the eleventh aspect, further comprising a display portion for displaying the number of times of activating the plurality of insurance pays, wherein the controller is configured to further execute the processing of:

determining whether the number of times of activating the plurality of insurance pays is to be displayed at the display portion; and displaying the number of times of activating the plurality of insurance pays at the display portion in accordance with a result of the determination.

According to the thirteenth aspect of the present invention, it is randomly determined whether to enable/disable the display of the number of times of activating insurance. Therefore, a player is allowed to have expectation for the contents of activating insurance by recognizing the number of times of activating insurance, or alternatively, to have interest as to patterns for activating insurance by keeping the number of times of activating insurance secret.

The gaming machine according to a fourteenth aspect of the present invention is directed to that according to the eleventh aspect, wherein the controller is configured to further execute the processing of:

randomly determining a volume of the prizes of the plurality of insurance pays;

storing the determined volume of the prizes of the plurality of insurance pays in the memory; and executing a corresponding insurance pay in accordance with the volume of the prizes stored in the memory, during activation of each of the insurance pays.

According to the fourteenth aspect of the present invention, the payout amount of a plurality of insurance pays can be randomly determined. Therefore, a player is allowed to have expectation as to an insurance pay to be paid out.

The gaming machine according to a fifteenth aspect of the present invention is directed to that according to the eleventh aspect, wherein the volume of the prize is stored in the memory in association with each of the insurance pays so as to increase in accordance with the number of times of activating the insurance pays.

According to the fifteenth aspect of the present invention, a player is allowed to award a profit of a small amount of insurance, prior to awarding a profit of a large amount of insurance. In this manner, the player can continue a game by utilizing the profit of the small amount of insurance, thus making it easy to continue a game until the large amount of insurance is obtained and making it easy to receive the profit of insurance.

A control method of a gaming machine, according to a sixteenth aspect of the present invention comprises the following configuration. That is, the control method comprises the steps of:

(a) rearranging the plural types of symbols on the display;

(b) counting the accumulative value by said unit game and storing the counted accumulative value in a memory;

(c) determining whether the accumulative value stored in the memory has reached the first threshold value, as a result of repeating the steps (a) and (b);

(d) activating the first insurance pay in accordance with the volume of the prize stored in the memory in accordance with the first threshold value, in a case where it is determined that the accumulative value has reached the first threshold value, as a result of the determination of the step (c);

(e) performing the step (a);

(f) further counting the accumulative value by unit game, and then, storing the counted accumulative value in the memory;

(g) determining whether the accumulative value stored in the memory has reached the second threshold value, as a result of repeating the steps (e) and (f); and (h) activating the second insurance pay in accordance with the volume of the prize stored in the memory in association with the second threshold value, in a case where it is determined that the accumulative value has reached the second threshold value, as a result of the determination of the step (g).

According to the sixteenth aspect of the present invention, a first insurance pay is activated before a condition for activating a second insurance pay is met, whereby a player can easily continue a game until the second insurance pay is activated. For example, the gaming machine of the present invention activates the first insurance pay when a 650-th game has completed, in a case where the number of games is employed as an accumulative value. The player can easily continue a game until the number of games (1,050 times) of activating the second insurance pay has been reached, by utilizing gaming values obtained by activation of the first insurance pay. In this manner, the profit of insurance can be appropriately given to the player.

A control method of a gaming machine, according to the seventeenth aspect of the present invention is directed to that according to the sixteenth aspect, further comprising the steps of:

(i) randomly determining a predetermined number of insurance pays from among a plurality of insurance pays;

(j) executing the steps (a) to (h);

(k) determining whether the determined predetermined number of insurance pays have been activated;

(l) executing the step (a) in accordance with a result of the determination of the step (k);

(m) further counting an accumulative value by unit game, and then, storing the counted accumulative value in the memory;

(n) determining whether the accumulative value stored in the memory has reached a third threshold value, as a result of repeating the steps (l) and (m); and (o) activating the third insurance pay in accordance with the volume of the prize stored in the memory in association with the third threshold value, in a case where it is determined that the accumulative value has reached the third threshold value, as a result of the determination of the step (n).

According to the seventeenth aspect of the present invention, the number of times of activating insurance is randomly determined. Therefore, a variety of patterns for activating insurance can be provided, allowing a player to enhance expectation for the contents of activating insurance.

A control method of a gaming machine, according to the eighteenth aspect of the present invention is directed to that according to the sixteenth aspect, further comprising the steps of: determining whether to display the number of times of activating the plurality of insurance pays; and displaying the number of times of activating the plurality of insurance pays at the display portion in accordance with a result of the determination.

According to an eighteenth aspect of the present invention, whether to enable/disable the display of the number of times of activating insurance is randomly determined. Therefore, a player is allowed to have expectation for the contents of activating insurance by recognizing the number of times of activating insurance, or alternatively, to have interest as to patterns for activating insurance by keeping the number of times of activating insurance secret.

A control method of a gaming machine, according to the nineteenth aspect of the present invention is directed to that according to the sixteenth aspect, further comprising the steps of:

randomly determining a volume of prizes of a plurality of insurance pays;

storing the determined volume of prizes of the plurality of insurance pays in the memory; and activating a corresponding insurance pay in accordance with the volume of the prizes stored in the memory during activation of each of the insurance pays.

According to the nineteenth aspect of the present invention, the payout amount of a plurality of insurance pays can be randomly determined. Therefore, a player is allowed to have expectation as to an insurance pay to be paid out.

A control method of a gaming machine, according to a twentieth aspect of the present invention, is directed to that according to the sixteenth aspect, wherein the volume of the prize is stored in the memory in association with each of the insurance pays so as to increase in accordance with the number of times of activating the insurance pays.

According to the twentieth aspect of the present invention, a player is allowed to award a profit of a small amount of insurance, prior to awarding a profit of a large amount of insurance. In this manner, the player can continue a game by utilizing the profit of the small amount of insurance, thus making it easy to continue a game until the large amount of insurance is obtained, and further, making it easy to receive the profit of insurance.

A control method of a gaming machine, according to a twenty-first aspect of the present invention is directed to that according to the sixteenth aspect, comprising the steps of:

(i) determining whether the symbols rearranged on the display form a winning combination or a predetermined number of symbols, as a result of repeating the processing (a) and (b);

(ii) in a case where it is determined that the symbols form a winning combination or a predetermined number of symbols, as a result of the determination of the processing (i), executing processing of awarding a special prize according to the winning combination or a predetermined number of symbols, resetting the accumulative value stored in the memory, and repeating the processing (a) and (b);

(iii) executing the processing (c) and (d), in a case where it is not determined that the symbols form a winning combination or a predetermined number of symbols, as a result of the determination of the processing (i);

(iv) determining whether the symbols rearranged on the display in the processing (e) form a winning combination or a predetermined number of symbols, as a result of repeating the processing (e) and (f);

(v) in a case where it is determined that the symbols form a winning combination or a predetermined number of symbols, as a result of the determination of the processing (iv), executing processing of awarding a special prize according to the winning combination or the predetermined number of symbols, resetting the accumulative value stored in the memory, and repeating the processing (a) and (b); and (vi) executing the processing (g) and (h), in a case where it is not determined that the symbols form a winning combination or a predetermined number of symbols, as a result of the determination of the processing (iv).

According to the twenty-first aspect of the present invention, in the case where a special prize has been obtained, an accumulative value according to activation of an insurance pay is reset. In this manner, if a player has obtained a lot of profit, the payout of insurance is not performed, thus allowing fairness to be kept between players.

A control method of a gaming machine, according to a twenty-second aspect of the present invention is directed to that according to the sixteenth aspect, comprising the steps of:

(i) determining the symbols rearranged on the display in the processing (a) form a winning combination or a predetermined number of symbols, as a result of repeating the processing (a) and (b);

(ii) in a case where it is determined that the symbols form a winning combination or a predetermined number of symbols, as a result of the determination of the processing (i), executing processing of awarding a special prize according to the winning combination or the predetermined number of symbols and executing processing of activating the insurance pay stored in the memory in accordance with the winning special prize and the processing (c) and (d);

(iii) executing the processing (c) and (d), in a case where it is not determined that the symbols form a winning combination or a predetermined number of symbols, as a result of the determination of the processing (i);

(iv) determining whether the symbols rearranged on the display in the processing (e) form a winning combination or a predetermined number of symbols, as a result of repeating the processing (e) and (f);

(v) in a case where the symbols form a winning combination or a predetermined number of symbols, as a result of the determination of the processing (iv), executing processing of awarding a special prize according to the winning combination or the predetermined number of symbols and executing processing of activating the insurance pay stored in the memory in accordance with the winning special prize and the processing (g) and (h);

(vi) executing the processing (g) and (h), in a case where it is not determined that the symbols form a winning combination or the predetermined number of symbols, as a result of the determination of the processing (iv); and (vii) resetting the accumulative value stored in the memory after performing the processing (h).

According to the twenty-second aspect of the present invention, an insurance pay is made when a special prize is given a player as well. In addition, an accumulative value according to activation of the insurance pay is not reset according to a winning special prize; and therefore, if a player performs a predetermined number of games, a profit of insurance is reliably imparted. Therefore, the player is allowed to have a sense of expectation for insurance.

According to the present invention, a gaming machine and a control method of the gaming machine having a new insurance function can be provided.

BRIEF DESCRIPTION OF THE DRAWINGS

FIG. 2 is a view for explaining an insurance payout value table;

FIG. 6 is a view showing arrangements of symbols drawn on peripheral faces of video reels;

FIG. 7 is a view for explaining a prize payment table;

FIG. 8 is a view for explaining an insurance payout table;

FIG. 22 is a view explaining an insurance payout value for free game in the second example;

FIG. 23 is a view explaining the number of times of activating insurance and the insurance payout value in the second example;

FIG. 25 is a view explaining in detail a free game of a two-stage rescue of a third example;

FIG. 33 is an explanatory view showing an example of display upon notification of a second insurance;

FIGS. 34A and 34B are views each showing an advertisement display of insurance;

FIG. 36 is an explanatory view showing a HELP image of insurance.

DESCRIPTION OF THE PREFERRED EMBODIMENTS

Figure 1:
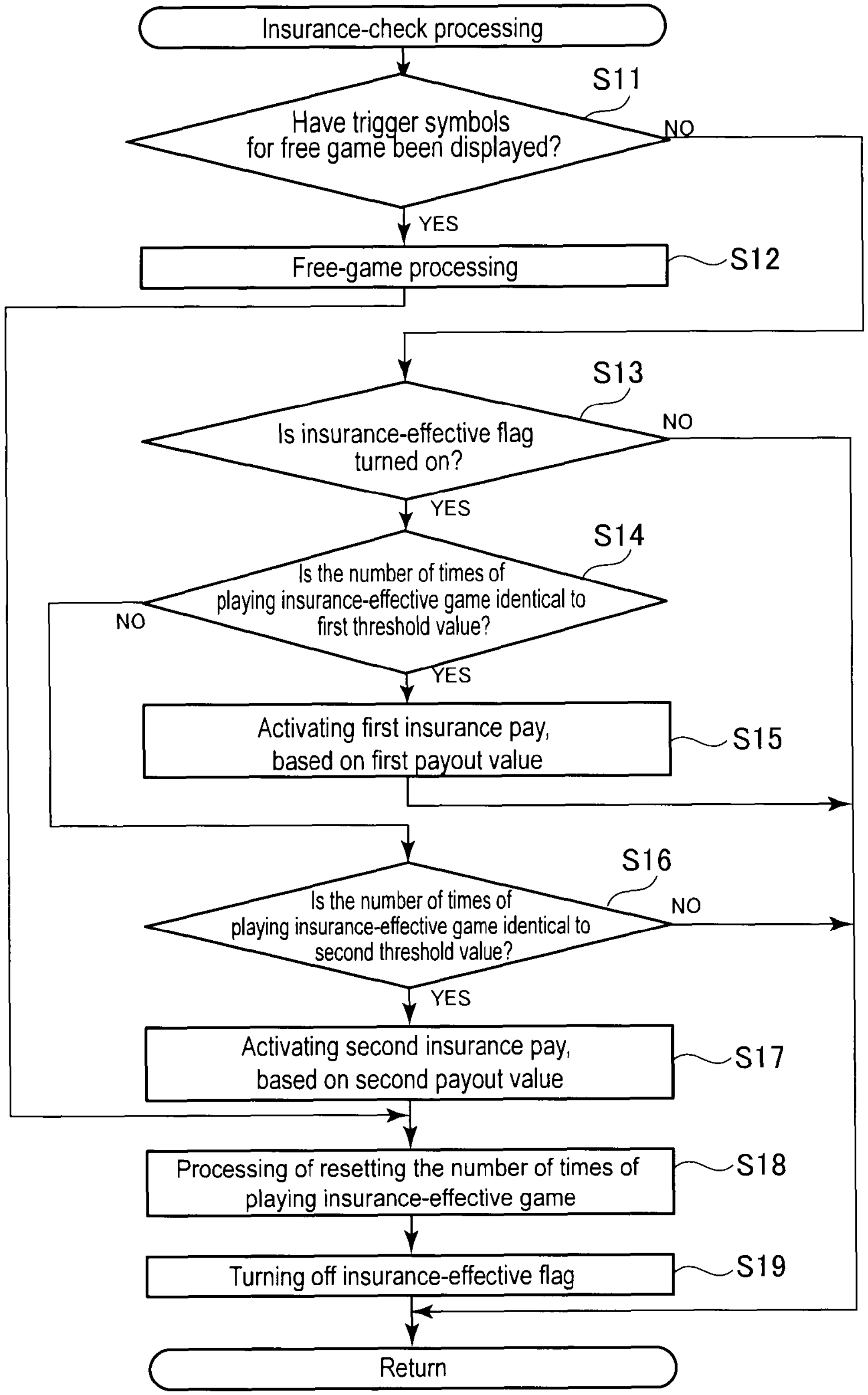
FIG. 1 is a flowchart showing insurance-check processing.

Hereinafter, a gaming machine according to the embodiments of the present invention will be described with reference to the drawings. FIG. 1 is a flowchart showing a subroutine of insurance-check processing.

First, a main CPU 71 determines whether or not trigger symbols for free game have been displayed (step S11). In the case of determining that the trigger symbols for free game have been displayed, the main CPU 71 performs free-game processing (step S12).

In the case where no trigger symbols for free game have been displayed, the main CPU 71 determines whether or not an insurance-effective flag is turned on (step S13). When determining that the insurance-effective flag is not turned on, the main CPU 71 completes insurance-check processing.

Next, in the case of determining that the insurance-effective flag is turned on, the main CPU 71 determines whether or not the number of times of playing an insurance-effective game is identical to a first threshold value (650 times, for example) (step S14).

Next, in the case of determining that the number of times of playing an insurance-effective game is identical to the first threshold value, the main CPU 71 activates a first insurance pay, based on a first payout value which is a first prize volume (step S15). In the embodiment, coins whose value corresponds to that obtained by multiplying an average multiplier of 1 to 650 games for the value corresponding to the first payout value determined with reference to FIG. 2A are added to a current value of a number-of-credits counter.

Next, in the case of determining that the number of times of playing an insurance-effective game is not identical to the first threshold value, the main CPU 71 determines whether or not the number of times of playing an insurance-effective game is identical to a second threshold value (1,050 times, for example) (step S16). In this processing, in the case of determining that the number of times of playing an insurance-effective game is not identical to the second threshold value, the main CPU 71 completes insurance-check processing.

On the other hand, in the case of determining that the number of times of playing an insurance-effective game is identical to the second threshold value, the main CPU 71 activates a second insurance pay, based on a second payout value which is the volume of a second prize (step S17). In the embodiment, a value obtained by multiplying the value of an average multiplier of 1 to 1,050 games for the value corresponding to the second payout value determined with reference to FIG. 2B is added to a current value of the number-of-credits counter.

Next, after the second insurance pay has been activated and in the case where a free game trigger has been established in a MAX line, the main CPU 71 resets the number of times of playing an insurance-effective game (step S18). The main CPU 71 then is turned off an insurance-effective flag (step S19). When this processing is performed, insurance-check processing is completed. The number of times of playing an insurance-effective game is reset when RAM resetting is performed as well.

Figure 3:
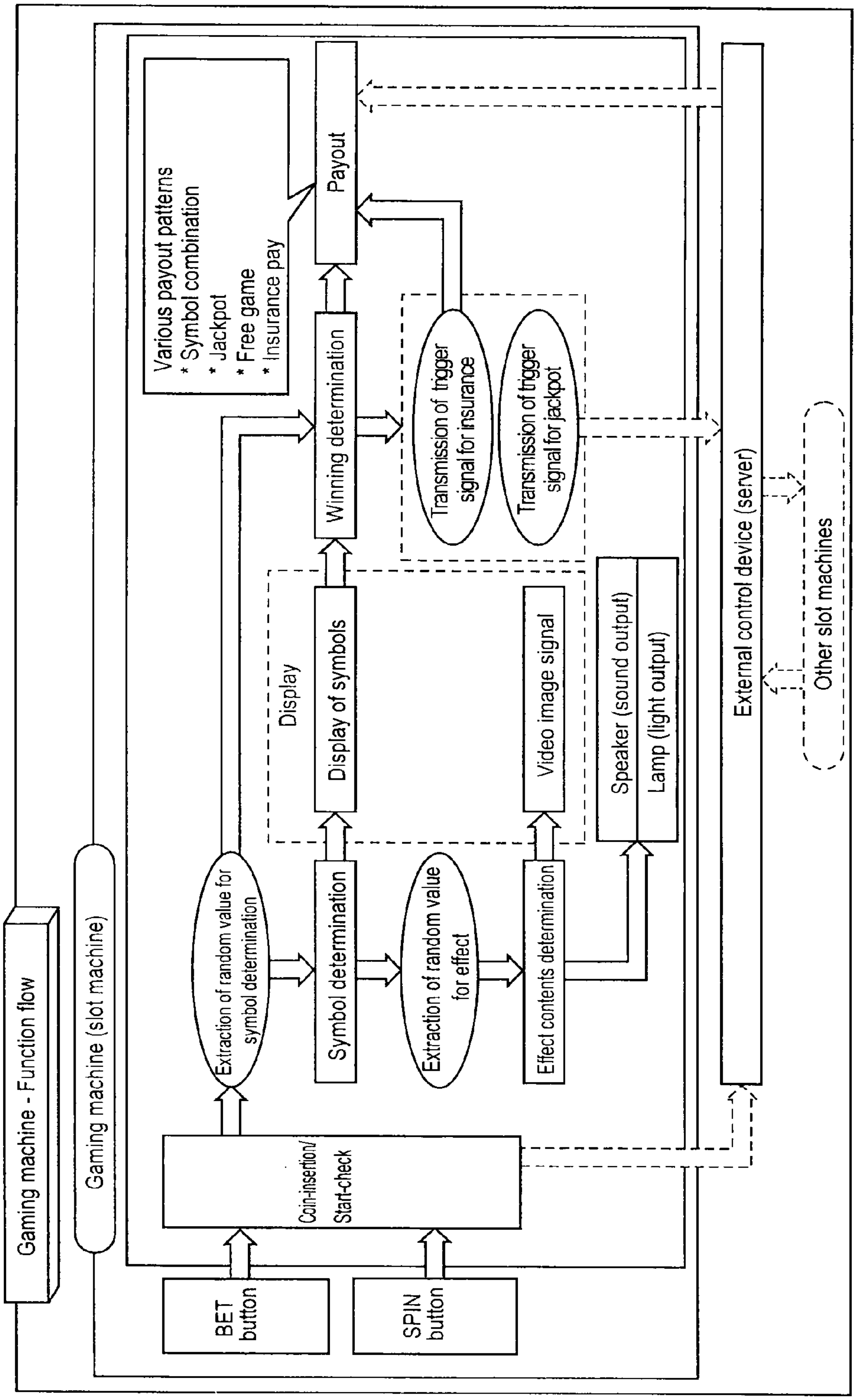
FIG. 3 is a diagram showing a functional flow of a gaming machine.

With reference to FIG. 3, basic functions of a gaming machine 1 according to the embodiment are described. FIG. 3 is a diagram showing a functional flow of the gaming machine 1 according to the embodiment of the present invention.

First, the gaming machine 1 checks whether or not BET buttons 34, 35 have been pressed by a player, and subsequently, checks whether or not a spin button 31 has been pressed by the player.

Next, if the spin button 31 is pressed by the player, the gaming machine 1 extracts random number values for determining symbols (see FIG. 6), and determines symbols to be rearranged in a symbol display region 4 displayed on a lower image display panel 141 as a display.

Next, the gaming machine starts scroll display of symbol arrangements of video reels 3*a* to 3*e*, respectively, and stops scroll-display so that determined symbols are displayed for a player.

Next, when scroll-display of symbol arrangements of video reels has been stopped, the gaming machine determines whether or not a combination of symbols rearranged on a pay-line is associated with a winning prize.

Next, when the combination of the symbols rearranged on the pay-line is associated with the winning prize, the gaming machine 1 awards a prize corresponding to a type of the combination of the symbols to a player. For example, when the combination of the symbols related to payout of coins has been displayed on the pay-line, the gaming machine 1 pays out coins whose number corresponds to the combination of the symbols to the player.

In addition, when the combination of the symbols related to the start of a free game has been rearranged on the pay-line, the gaming machine 1 starts the free game. This free game allows determination of the symbols rearranged as described previously to be performed over a predetermined number of times without consuming coins.

Further, in the case where a combination of symbols related to a jackpot has been rearranged on the pay-line, the gaming machine 1 pays out coins whose value corresponds to an amount of jackpot to a player. A term "jackpot" denotes that some of the coins consumed by the player in each of gaming machines 1 are accumulatively added to the amount of jackpot. Moreover, this term also denotes a function of paying out coins whose value corresponds to the amount for accumulation to the amount of jackpot, to the gaming machine 1 in which the combination of symbols related to a jackpot has been rearranged on the pay-line. The gaming machine 1 calculates an amount (amount for accumulation) to be accumulatively added to the amount of jackpot by unit game, and transmits the calculated amount to an external control device 200. The external control device 200 accumulatively adds the amount for accumulation, which has been transmitted from each of the gaming machines 1 to the amount of jackpot.

In addition, an insurance function is provided in a gaming machine. This insurance function is directed to that provided for the purpose of saving a player from a situation in which a free game is not performed for a long period of time. In the embodiment, a player can arbitrarily select whether or not to make insurance effective. In the case where insurance is made effective, it is in replacement of a predetermined insurance. In the case where insurance has been made effective, the gaming machine 1 starts counting of the number of times of playing a game in which insurance has been made effective, as an accumulative value. In addition, when the counted number of times of playing a game has reached a predetermined threshold value without performing payout of a large amount due to a free game or the like, the gaming machine 1 performs the payout of coins whose value is set for insurance.

The gaming machine 1 performs effects such as: image display by means of a lower image display panel 141 and an upper image display panel 131 as a display; light output by means of a lamp 111; and sound output by means of a speaker 112. The gaming machine 1 determines random number values for effects, and determines the contents of effects, based on the determined symbols or the like.

Figure 4:
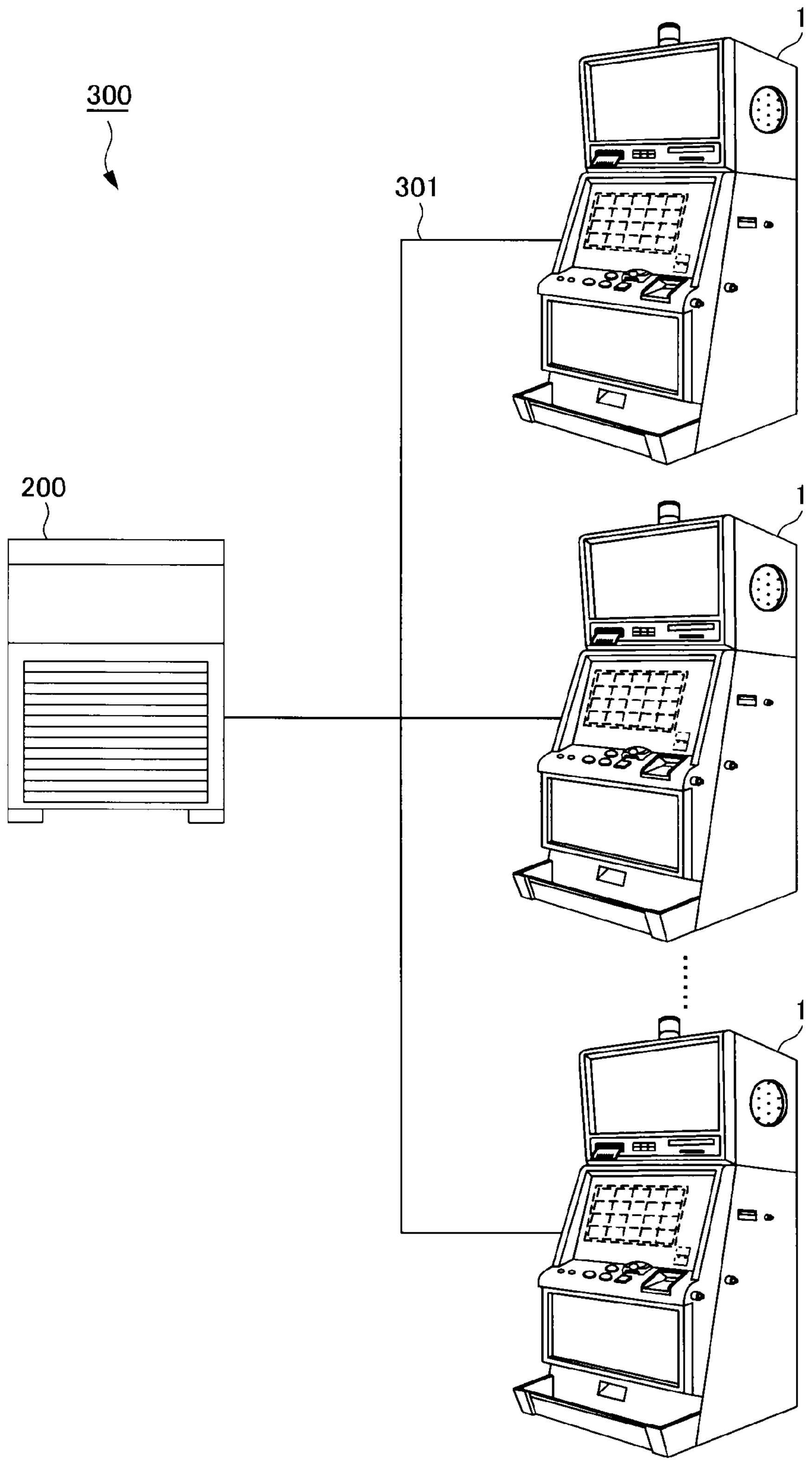
FIG. 4 is a view showing a game system including the gaming machine.

The basic functions of the gaming machine 1 have been described above. Next, with reference to FIG. 4, a game system 300 including the gaming machine 1 will be described. FIG. 4 is a view illustrating the game system 300 including the gaming machine 1 according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and a dedicated line, an exchange line or the like may be employed.

Figure 5:
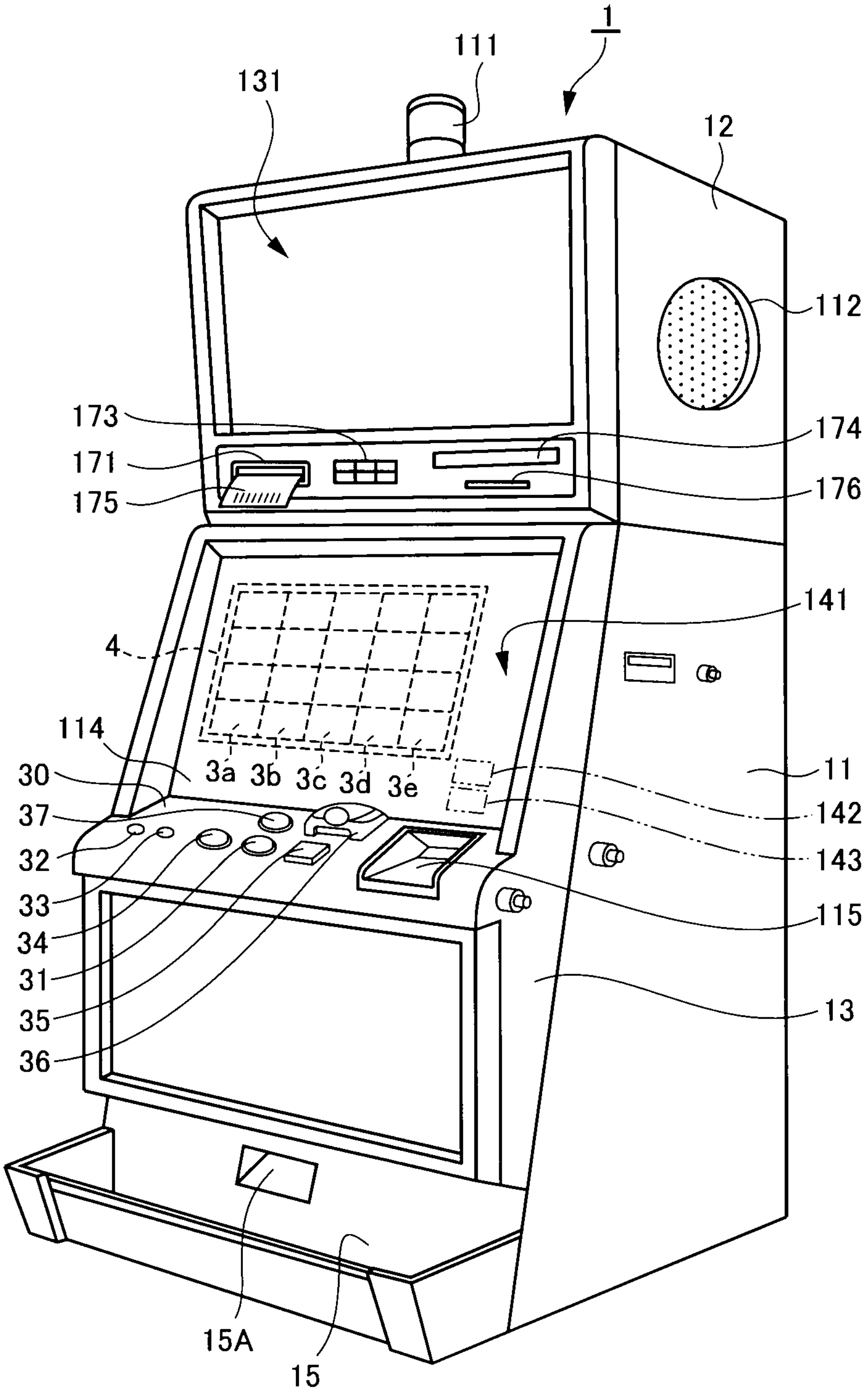
FIG. 5 is a perspective view showing an appearance of the gaming machine.

Next, with reference to FIG. 5, a configuration of gaming machines 1 in the embodiment will be described. FIG. 5 is a perspective view showing an appearance of the gaming machine 1.

A coin, a bill, or electrically valuable information corresponding thereto is used as a game medium in the gaming machine 1. Further, in the present embodiment, a later-described ticket with a barcode is also used. It is to be noted that the game medium is not limited thereto, and for example medals, tokens, electric money or the like can be employed.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed. In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 6 which will be described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player. The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In addition, a number-of-credits display portion 142 and a number-of-payouts display portion 143 are set on the lower image display panel 141. On the number-of-credits display portion 142, the number of credited coins is displayed by means of image. On the number-of-payouts display portion 143, symbols of same types are displayed, and in the symbol display region 4, the number of coins to be paid out in the case where a predetermined number or more of symbols of same types have been displayed in a stopped state is displayed by means of image.

Further, a touch panel 114 is provided on a front face of the lower image display panel 141, so that a player can input a variety of commands by operating the touch panel 114.

Downward of the lower image display panel 141, there are provided: a control panel 30 made of a plurality of buttons 31 to 35 employed by a player inputting a command related to the progress of a game; a coin accepting slot 36 for accepting coins in a cabinet 11; and a bill validator 115.

On the control panel 30, there are provided: a spin button 31; a change button 32; a CASHOUT button 33; a 1-BET button 34; a MAXBET button 35; and an insurance BET button 37. The spin button 31 is for inputting a command for starting scroll-display of symbols. The change button 32 is employed for asking the attendant in game facility for making change (s). The CASHOUT button 33 is for inputting a command for paying out credited coins to a coin tray 15.

The 1-BET button 34 is for inputting a command for inserting one coin in the play of a game, from among the credited coins. The MAXBET button 35 is for inputting a command for inserting the maximum permissible number of coins (50 coins in the embodiment), which can be inserted in one game, from among the credited coins. The 1-BET button 34 and the MAXBET button 35 are BET buttons for starting a game.

The insurance BET button 37 is for inputting a command for inserting a predetermined number of coins (1 coin, for example), from among the credited coins, in order to make an insurance function effective. Entry for making the insurance function effective by means of the insurance BET button 37 is arbitrarily performed by a player, unlike the BET buttons 34, 35. In the embodiment, the insurance BET button 37 is operated, whereby an amount of insurance, $1.00, is subtracted from the credits stored in the RAM 73 on a game-by-game basis.

A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, outputting the light, and combinations thereof.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

Next, with reference to FIG. 6, a symbol arrangement table will be described. FIG. 6 is a view showing arrangements of symbols drawn on the outer surfaces of video reels 3*a* to 3*e* of the gaming machine 1 according to the embodiment of the present invention.

A first video reel 3*a*, a second video reel 3*b*, a third video reel 3*c*, a fourth video reel 3*d*, and a fifth video reel 3*e*, respectively, are assigned with a symbol array made up of 22 symbols that correspond to the code numbers from “00” to “21”, respectively. Types of the symbols provided are “2” to “8”, “J”, “Q”, “K”, and “A”.

Next, with reference to FIG. 7, a description of prizes will be given. FIG. 7 is a view for explaining a prize payment table. The “2” to “8”, “J” “Q”, “K”, and “A” symbols are those constituting a combination of the payout of prize. In the case where three or more of these symbols of same type are displayed (rearranged) in a stopped state on the pay-lines on the lower image display panel 141, a winning combination is assumed to have been established, and then, with reference to FIG. 7, a predetermined number of coins are paid out as a prize in accordance with the type or number of symbols and the number of BETs. For example, if three, four, or five “Q” symbols are displayed in a stopped state on any of pay-lines, 70, 140, or 280 coins are paid out (based on calculation per one coin insertion), respectively. There are 50 pay-lines in the gaming machine of the embodiment.

Hereinafter, a description of the “A” symbol will be given. The “A” symbol is a symbol constituting a combination of jackpot execution. If three or more of the “A” symbols are displayed (rearranged) in a stopped state on any of the pay-lines on the lower image display panel 141, and then, a jackpot is executed. That is, three or more of the “A” symbols are displayed (rearranged) in a stopped state, whereby a symbol combination for jackpot execution is formed.

Next, with reference to FIGS. 8A and 8B, the payout values of insurance will be described. FIGS. 8A and 8B are views for explaining an insurance payout table. FIGS. 8A and 8B are the same as FIGS. 2A and 2B. In the gaming machine 1 of the present invention, in the case where an accumulative value (the number of games in which insurance has been made effective in the embodiment) has reached a first threshold value, coins are paid out as a first insurance pay, based on the first payout value of the table shown in FIG. 8A. In addition, in the gaming machine 1, in the case where an accumulative value has reached a second threshold value, coins are paid out as a second insurance pay, based on the second payout value of the table shown in FIG. 8B. The first payout value and the second payout value are randomly determined by employing random number values (see FIG. 12). In the embodiment, as described in detail in step S164 and step S166, a player is given the payout of an insurance whose value is identical to that obtained by multiplying average multipliers for the first and second payout values, leading up to the first and second threshold values.

Figure 9:
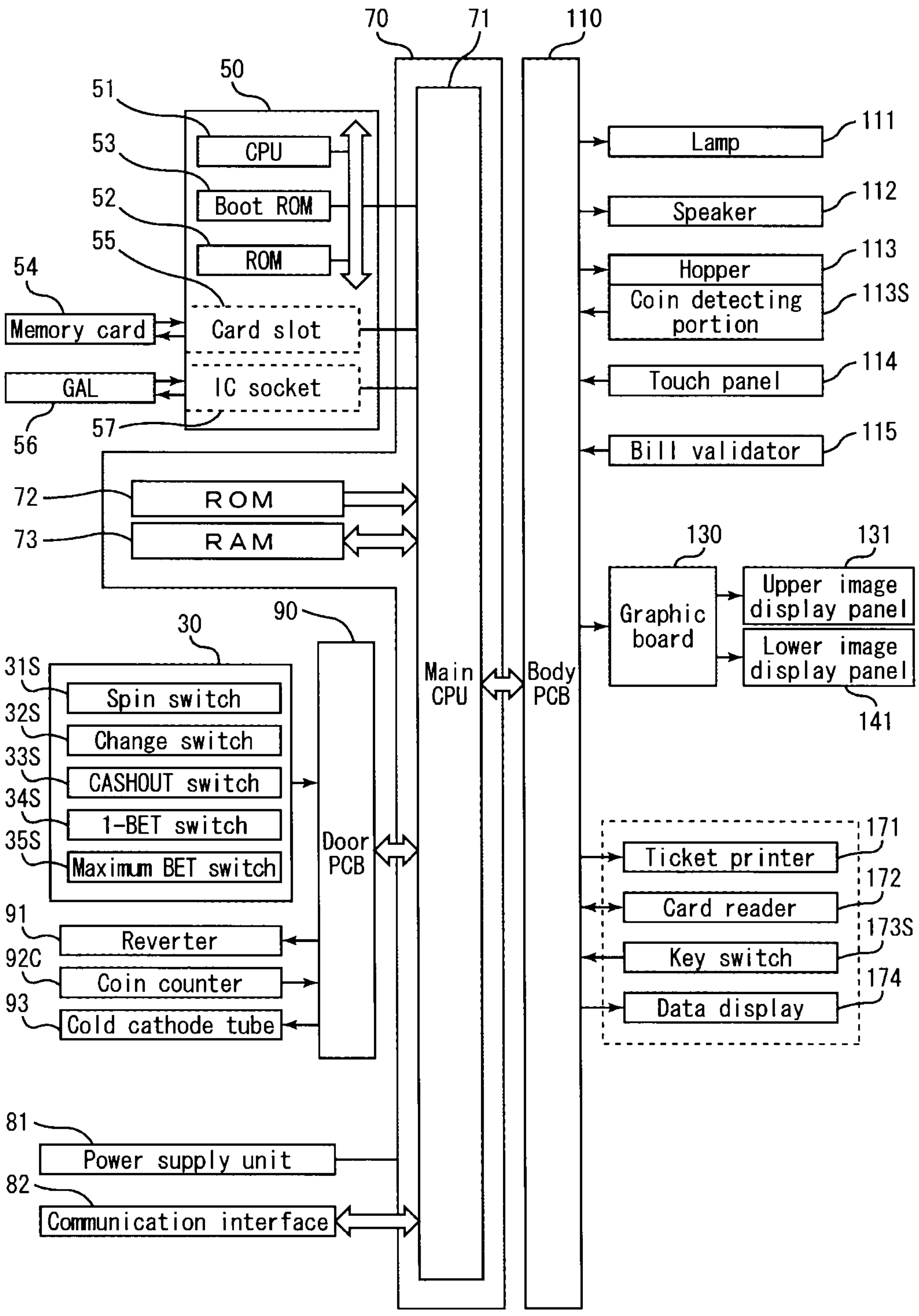
FIG. 9 is a block diagram showing an internal configuration of the gaming machine.

Next, with reference to FIG. 9, an internal configuration of a gaming machine will be described. FIG. 9 is a block diagram showing the internal configuration of the gaming machine 1. A gaming board 50 is provided with: a set of a CPU 51, a ROM 52, and a boot ROM 53, which are interconnected by means of an internal bus; a card slot 55 which is compatible with a memory card 54; and an IC socket 57 which is compatible with a GAL (Generic Array logic) 56.

The memory card 54 is made of a nonvolatile memory, and stores game programs and game system programs. The game programs include: a program related to the progress of a game; a prize determination program; and a program for executing effects by means of image or sound. The prize determination program is for determining symbols to be rearranged in the symbol display region 4 (in other words, code numbers corresponding to the symbols, as shown in FIG. 6).

The abovementioned prize determination program includes symbol-weighted data corresponding to a respective one of plural types of payout rates (80%, 84%, 88%, for example). The symbol-weighted data is for defining a random number value when each of the symbols is determined.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for authenticating that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73, as a memory, stores data or programs employed when the main CPU 71 operates. For example, these programs can be stored when processing has been performed for loading the game programs and game system programs or authentication programs described previously. In addition, work areas for executing the above-described programs is provided in the RAM 73. For example, areas to be provided are: an area of storing a counter for managing the number of games in which insurance as an accumulative value has been made effective, the number of BETs, the number of payouts, the number of credits or the like; and an area of storing determined symbols (code numbers) or the like. Further, in the embodiment, the RAM 73 stores a first threshold value, a second threshold value, an average multiplier, a first payout value, and a second payout value (see FIGS. 8A and 8B). Furthermore, the RAM 73 stores a variety of flags such as an insurance-effective flag indicating whether or not an insurance function is effective.

The communication interface 82 is for communicating with the external control device 200 such as a server, through the communication line. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices, the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S, a maximum BET switch 35S and an insurance BET switch 37S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place.

When accepting a valid bill, the bill validator 115 outputs a signal corresponding to an amount of the bill to the main CPU 71.

The graphic board 130 controls image display to be provided by a respective one of the upper image display panel 131 and the lower image display panel 141, based on a control signal output from the main CPU 71. The graphic board 130 is provided with a VDP for generating image data or a video RAM or the like for storing image data generated by the VDP.

The ticket printer 171 prints on a ticket a barcode representing encoded data of the number of credits stored in RAM 73, date, the identification number of the gaming machine 1, and the like, and outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

Figure 10A:
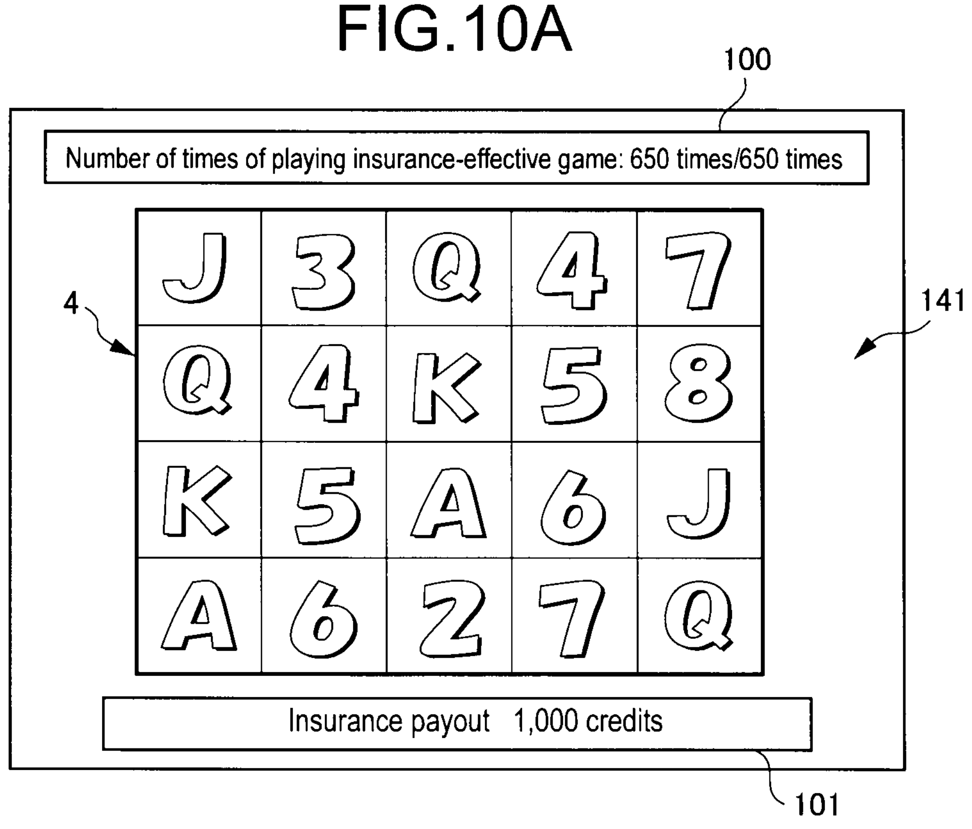
FIGS. 10A and 10B are views each showing one example of an image displayed on a low image display panel.
Figure 10B:
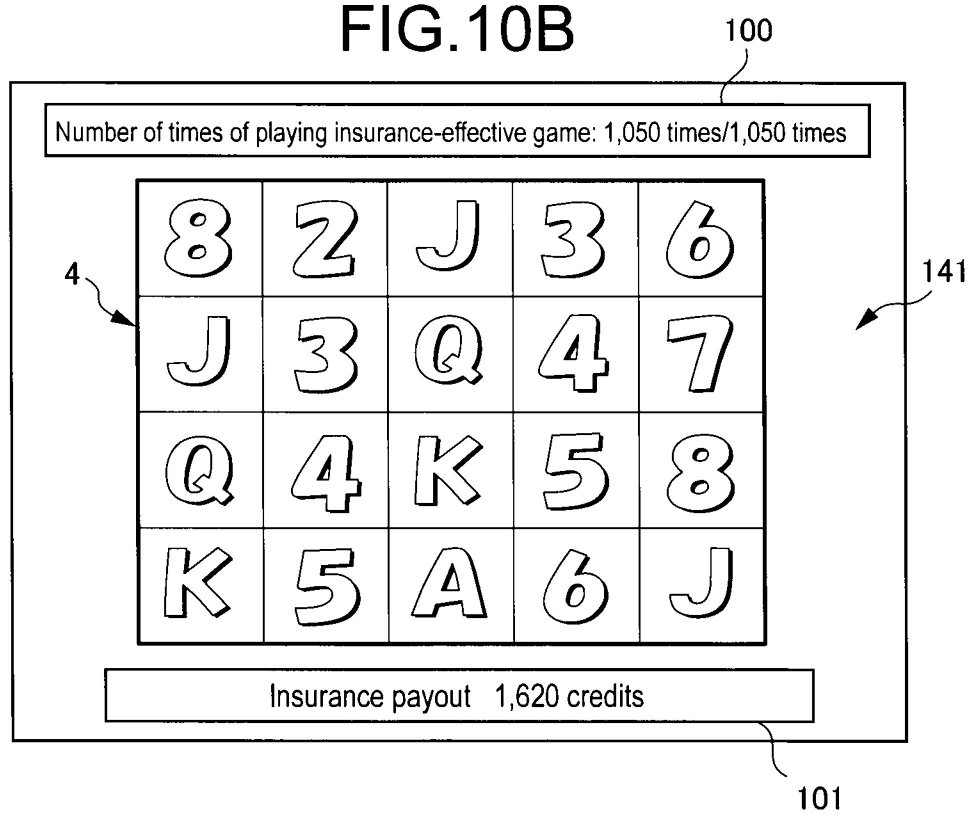

Next, with reference to FIGS. 10A and 10B, the images to be displayed on the lower image display panel 141 will be described. FIGS. 10A and 10B are views each showing an exemplary image displayed on the lower image display panel 141.

As shown in FIG. 10A, on the lower image display panel 141, there are provided: a symbol display region 4 in which symbols are to be rearranged; an area 100 for displaying the number of times of playing an insurance-effective game; and an area 101 for notifying the state of a game to a player. The gaming machine 1 of the embodiment employs a minimum unit of basic Bet, in which: there are 50 pay-lines, although are not shown; and 25 credits are 50 MAX lines. Here is shown an example of a case in which, if the first threshold value is set at 650 times as the number of times of playing an insurance-effective game, 50 bets have been continued in 1 to 650 games (i.e., the average number of BETs per Line in 1 to 650 games is 2.000). In this case, the gaming machine 1 pays out coins, based on a value (1,000) obtained by multiplying the randomly determined first payout value (500 in this example) by an average multiplier in 1 to 650 games (2 in this example, i.e., a value obtained by carrying the third place below a decimal point on average number of BETs per Line).

FIG. 10B shows a case in which, if the second threshold value has been set at 1,050 as the number of times of playing an insurance-effective game, the number of times of playing an insurance-effective game has reached the second threshold value. Here is shown an example of a case in which 50 BETs are placed in 1 to 650 games and 25 BETs are placed in 651 to 1,050 games (that is, average number of BETs per Line in 1 to 1,050 games is 1.619 . . . ). In this case, after the first insurance payout, 400 games are further performed, and the number of times of playing an insurance-effective game has reached 1,050 times which is the second threshold value. Therefore, a player is given the payout of coins whose value is identical to a value (1,620) obtained by multiplying an average multiplier (1.62) in 1 to 1,050 games for the randomly determined second payout value (1,000). Afterwards, the gaming machine 1 resets the number of times of playing an insurance-effective game.

Figure 11A:
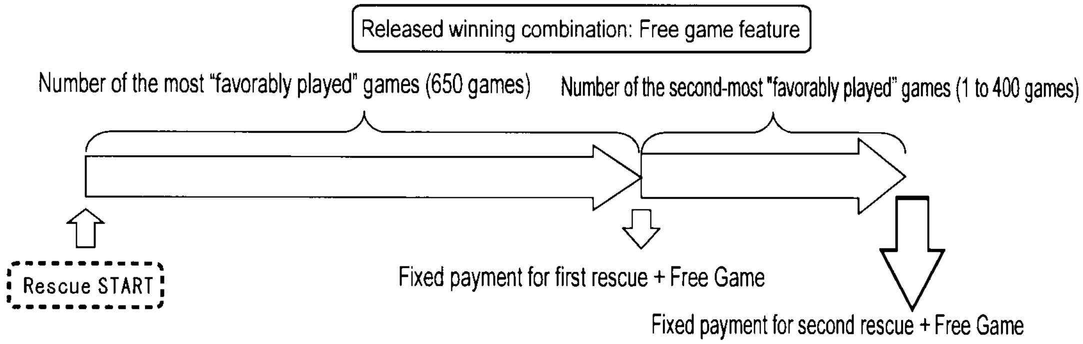
FIGS. 11A and 11B are views each showing a payout state of a plurality of insurance pays.
Figure 11B:
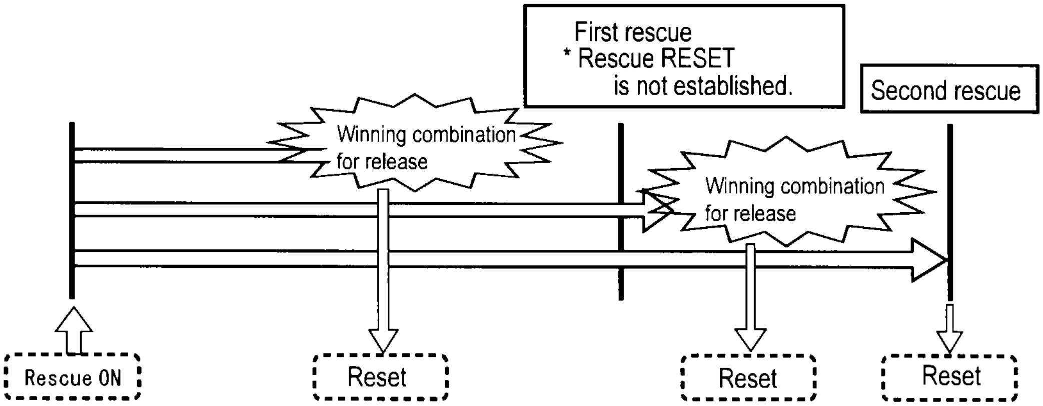

FIGS. 11A and 11B are views showing the payout states of a plurality of insurance pays in the gaming machine 1 of the embodiment. As shown in FIG. 11A, the gaming machine 1 controls a rescue of the second stage to be executed as a plurality of insurance pays. Specifically, the gaming machine 1 executes a first rescue and a second rescue. In the first rescue, in the case where a rescue function is controlled at the same time as when a game is started, if a free game is not won during termination of the consecutive 650 games in a MAX line play, the payout of a fixed payment and a free game feature are provided to a player. In the second rescue, after the first insurance has been paid, if a free game is not won during consecutive 1 to 400 games on a further MAX line play, the payout of a fixed payment and a free game feature are provided to a player.

The first insurance and the second insurance do not execute the payout of a fixed payment and a free game feature, if a free game is not won, i.e., if a winning combination for release is established. The winning combinations for release are winning combinations of symbols, constituting a free game feature.

Next, with reference to FIGS. 12 to 19, the programs to be executed by the gaming machine 1 will be described.

Figure 12:
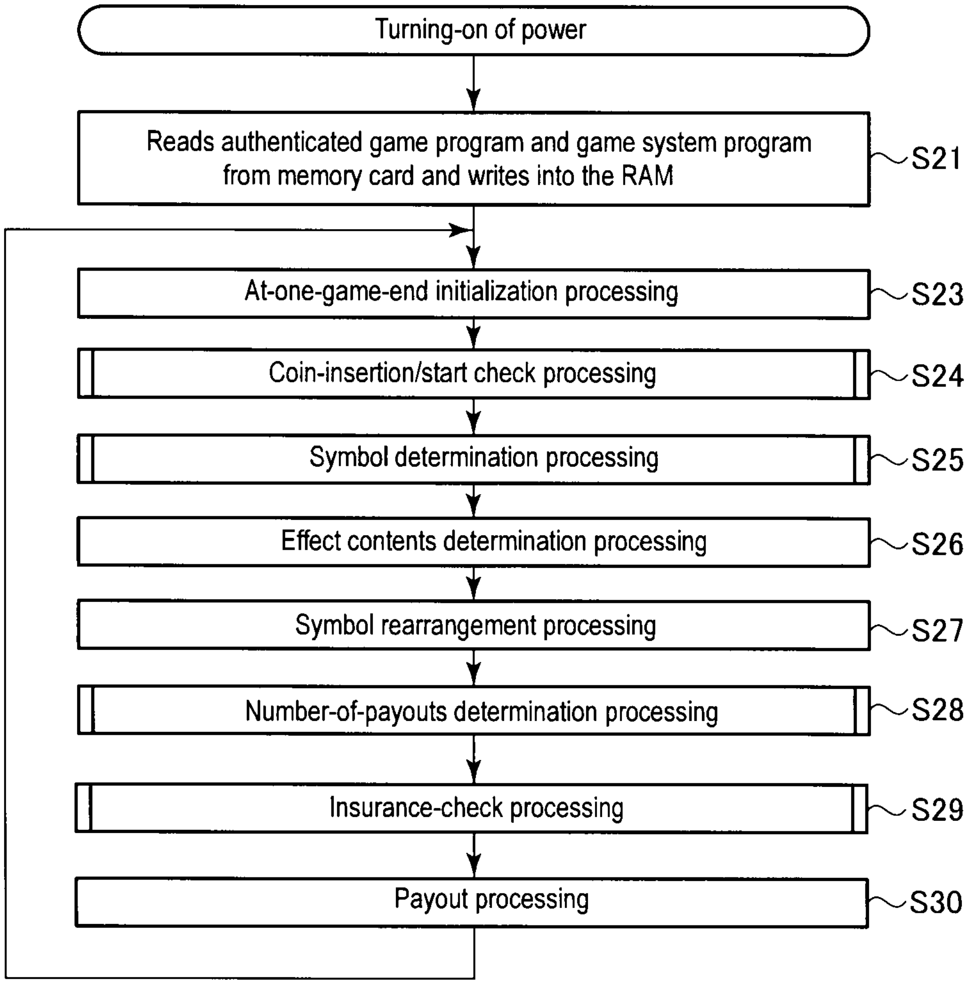
FIG. 12 is a flowchart showing a routine of main processing.

First, with reference to FIG. 12, main processing will be described. FIG. 12 is a flowchart showing a routine of main processing of the gaming machine 1. First, when power is supplied to the gaming machine 1, the main CPU 71 reads out the game program and game system program that are authenticated from the memory card 54, and writes them into the RAM 73 (step S21).

Next, the main CPU 71 conducts at-one-game end initialization processing (step S23). For example, data which is needed to be deleted, such as the number of BETs and the symbols, etc. determined by the determination processing of step S112 in FIG. 16, which will be described later, is cleared from the work area of the RAM 73 on a one-by-one game basis.

Figure 13:
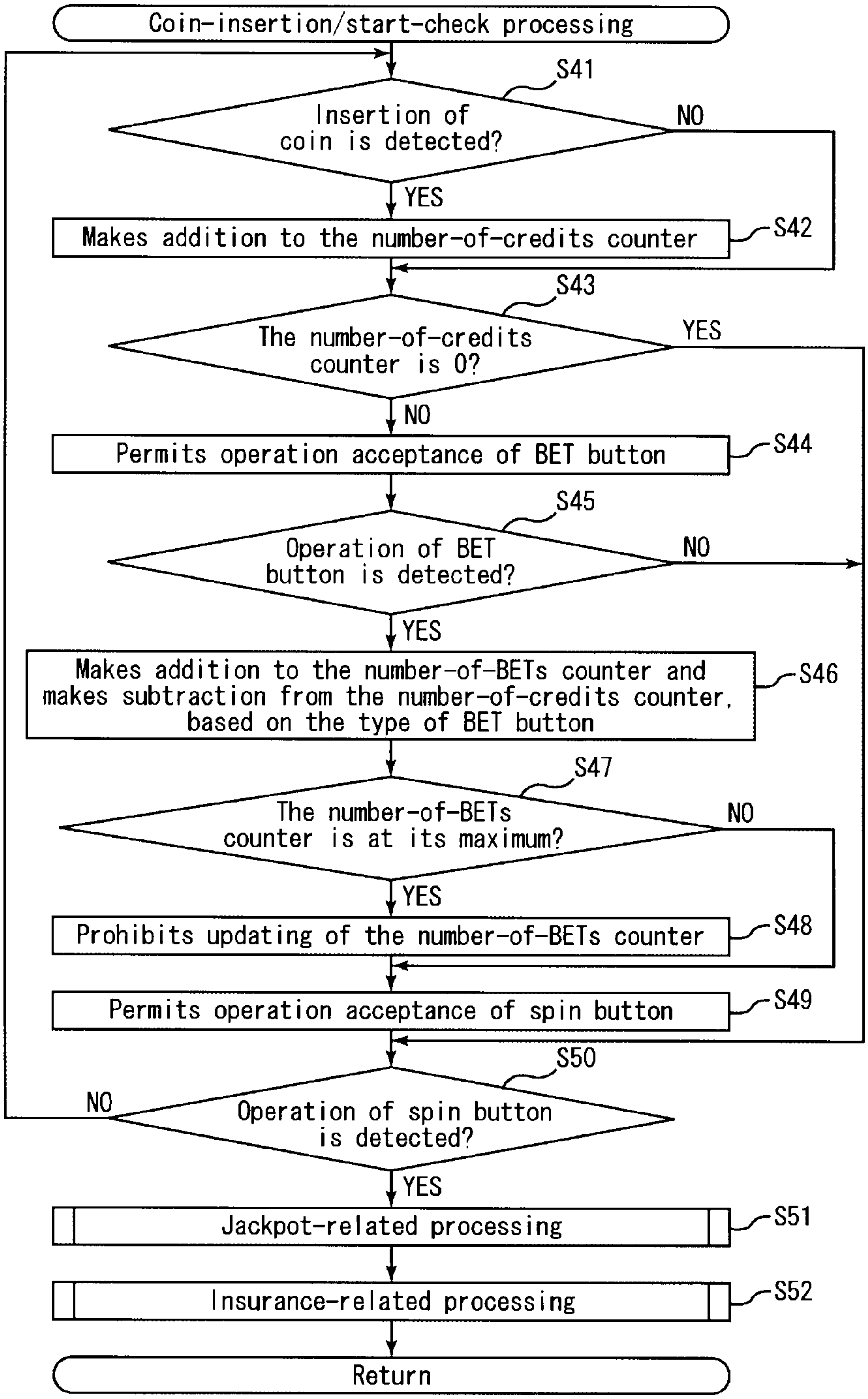
FIG. 13 is a subroutine of coin insertion/start check processing.

Next, the main CPU 71 conducts coin insertion/start check processing (step S24). In this processing, input check of a BET switch or a spin switch or the like is performed. With reference to FIG. 13, the coin insertion/start check processing will be described later in detail.

Figure 16:
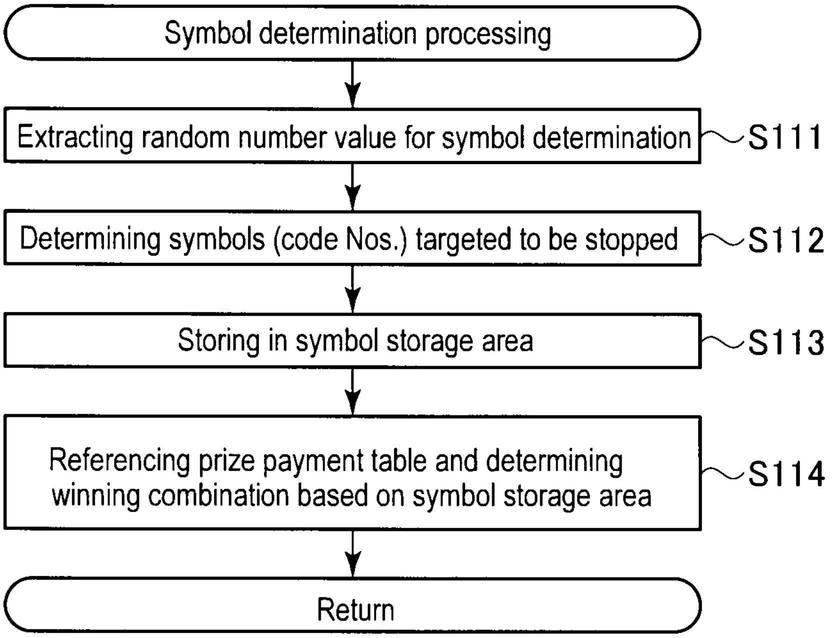
FIG. 16 is a flowchart of symbol determination processing.

Next, the main CPU 71 conducts symbol determination processing (step S25). In this processing, symbols (code numbers) to be stopped are determined based on random number values for symbol determination. With reference to FIG. 16, the symbol determination processing will be described later in detail.

Next, the main CPU 71 conducts effect contents determination processing (step S26). In this processing, the effect contents are determined based on random number values for effects, with reference to the to-be stopped symbols, determined in the symbol determination processing of step S25.

Next, the main CPU 71 conducts symbol rearrangement processing (step S27). In this processing, the to-be stopped symbols determined in the symbol determination processing of step S25 are automatically rearranged in the symbol display region 4 of the lower image display panel 141.

Figure 17:
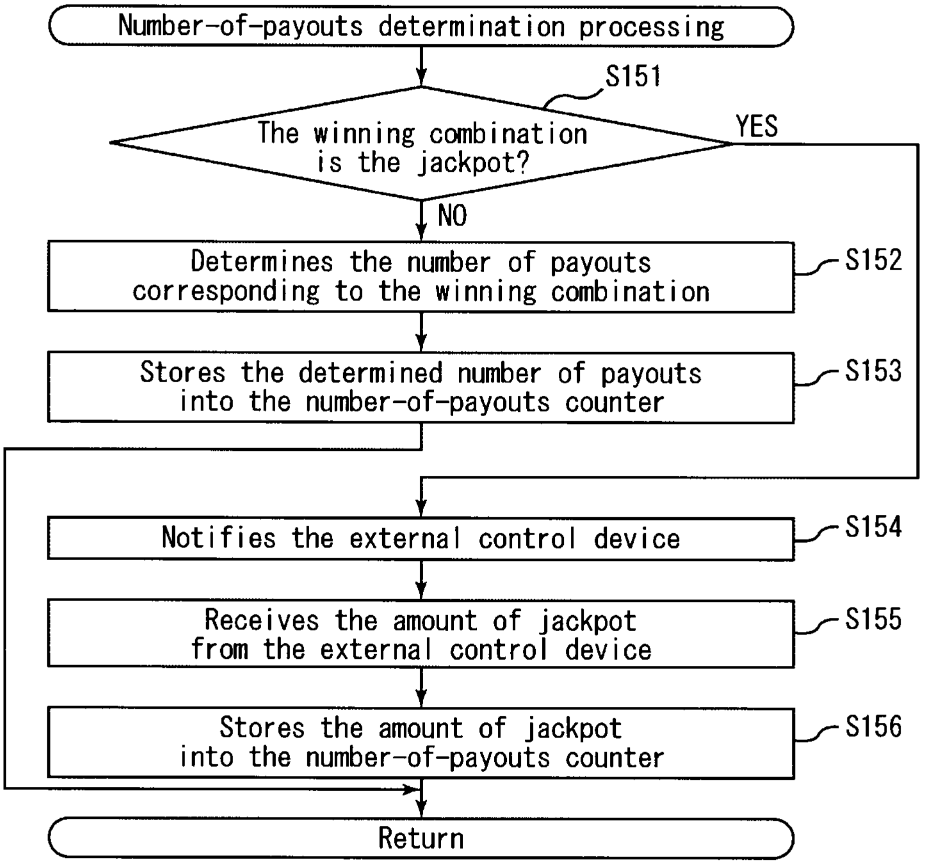
FIG. 17 is a flowchart showing a subroutine of processing of determining the number of payouts.

Next, the main CPU 71 conducts number-of-payouts determination processing (step S28). In this processing, when a combination allowing the payout of a prize is established on a pay-line by the symbols rearranged in the symbol display region 4, the number of payouts is determined depending upon a prize payment table and a BET amount, and the determined number of payments is then stored in a number-of-payouts counter provided in the RAM 73. With reference to FIG. 17, the number-of-payouts determination processing will be described later in detail.

Figure 18:
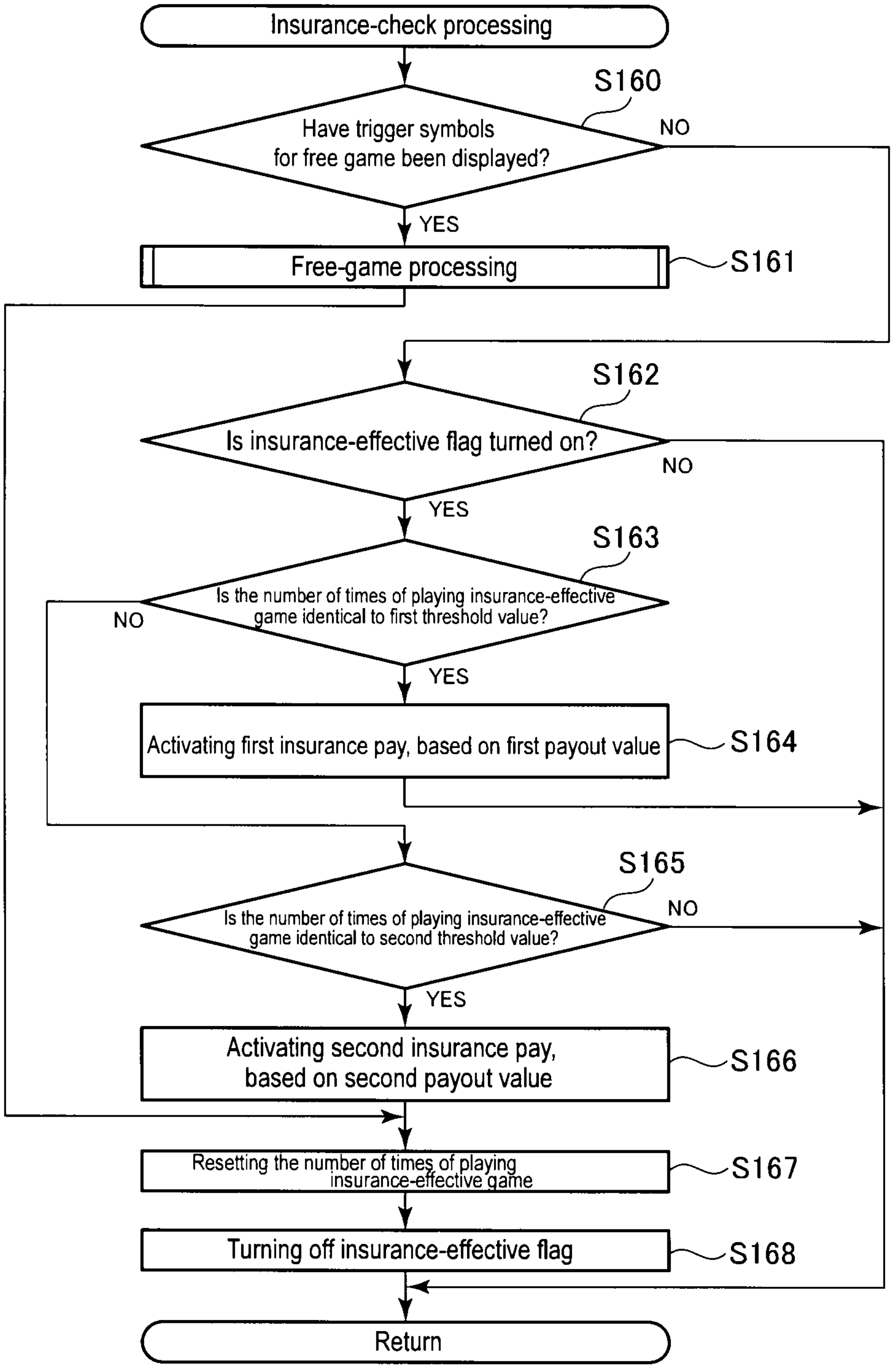
FIG. 18 is a flowchart showing a subroutine of the insurance-check processing.

Next, the main CPU 71 conducts insurance-check processing (step S29). In the case where insurance is effective, the main CPU 71 conducts payout of insurance which corresponds to either of the first and second payout values, based on the state of a game. With reference to FIG. 18, the insurance-check processing will be described later in detail.

The main CPU 71 conducts payout processing (step S30). The main CPU 71 basically adds the value stored in the number-of-payouts counter to a current value of a number-of-credits counter provided in the RAM 73. It is to be noted that operations of the hopper 113 may be controlled based on input from the CASHOUT switch 33S, and coins whose number corresponds to the value stored in the number-of-payouts counter may be discharged from the coin payout exit 15A. Further, operations of the ticket printer 171 may be controlled and a ticket with a barcode may be issued. After the processing has been conducted, the processing is shifted to step S22.

Next, with reference to FIG. 13, coin insertion/start check processing will be described. FIG. 13 is a flowchart showing a subroutine of the coin insertion/start check processing. First, the main CPU 71 determines whether or not coin insertion has been detected by means of a coin counter 92C (step S41). When determining that the coin insertion has been detected, the main CPU 71 adds a number-of-credits counter (step S42). In addition to the coin insertion, a bill validator 115 may be employed to determine whether or not bill insertion has been detected. In other words, when the bill validator determines that the bill insertion has been detected, a value corresponding to the inserted bill may be added to a current value of the number-of-credits counter.

Next, the main CPU 71 determines whether or not the number-of-credits counter is 0 (step S43). That is, after step S42 or when determining that no coin insertion has been detected in step S41, the main CPU 71 determines whether or not the number-of-credits counter indicates 0. When determining that the number-of-credits counter does not indicate 0, the main CPU 71 enables acceptance of BET button operation (step S44).

Next, the main CPU 71 determines whether or not operation of any of the BET buttons has been detected by the BET switch (step S45). When the main CPU 71 determines that the BET switch has detected the pressing of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). The main CPU 71 permits operation acceptance of the spin button (step S49). That is, after step S48 or when determining in step S47 that the number-of-BETs counter is not at its maximum, operation acceptance of the spin button is permitted.

The main CPU 71 determines whether or not operation of the spin button has been detected (step S50). That is, after step S49 or when determining in step S45 that the operation of any of the BET buttons has not been detected, or when determining in step S43 that the number-of-credits counter is zero, it is determined whether or not the operation of the spin button has been detected. When the main CPU 71 determines that the operation of the spin button has not been detected, the processing is shifted to step S41.

When the main CPU 71 determines that the operation of the spin button has been detected, the main CPU 71 conducts jackpot-related processing (step S51). The jackpot-related processing will be described later in detail, with reference to FIG. 14. Next, the main CPU 71 conducts insurance-related processing (S52). The insurance-related processing will be described later in detail, with reference to FIG. 15. After the processing has been conducted, the coin-insertion/start-check processing is completed.

Figure 14:
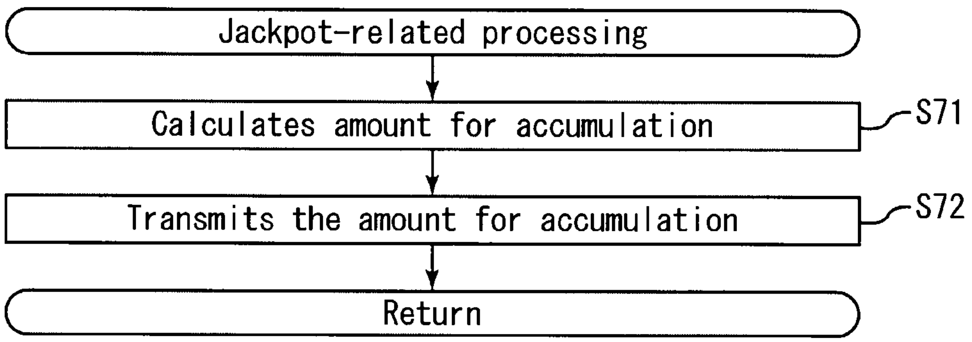
FIG. 14 is a flowchart showing a subroutine of jackpot-related processing.

Next, with reference to FIG. 14, jackpot-related processing will be described. FIG. 14 is a flowchart showing a subroutine of the jackpot-related processing. First, the main CPU 71 calculates an amount for accumulation (step S71). In this processing, a product between a value of the number-of-BETs counter and a preset accumulation rate is obtained, and the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

Figure 15:
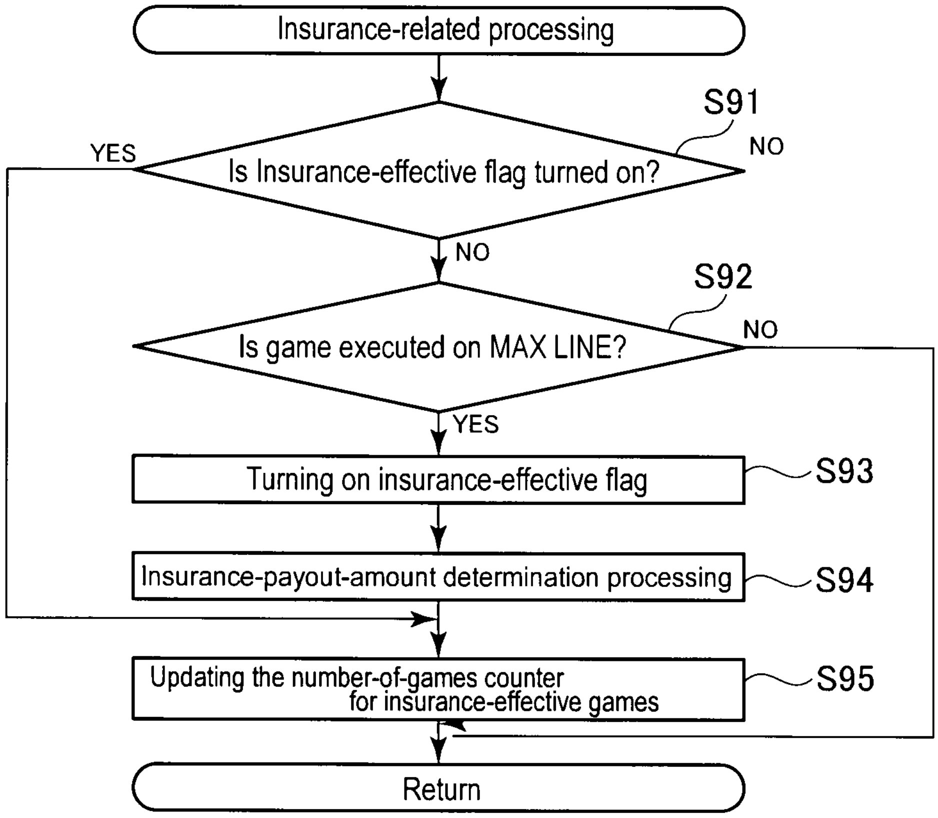
FIG. 15 is a flowchart showing a subroutine of insurance-related processing.

Next, with reference to FIG. 15, insurance-related processing will be described. FIG. 15 is a flowchart showing a subroutine of insurance-related processing. First, the main CPU 71 determines whether or not an insurance-effective flag is turned on (step S91). In the case where it is not determined that the insurance-effective flag is turned on, the main CPU 71 determines whether or not a game has been executed in a MAX line (step S92), or alternatively, in the case where it is determined that the game has been conducted on the MAX line, this CPU turns the insurance-effective flag on (step S93). That is, in the case where a player has placed 25 BETs or more in order to activate 50 MAX lines, insurance is automatically made effective.

Next, the main CPU 71 conducts processing of determining the amount of payout for insurance (step S94). The main CPU 71 randomly determines one numeric value from random number values (0 to 3), and determines a first payout value, based on a first payout value table for insurance (see FIG. 8A) to be stored in the RAM 73. Similarly, the main CPU 71 randomly determines one numeric value from the random number values (0 to 3), and then, determines a second payout value, based on a second payout value table for insurance (see FIG. 8B).

When determining that the insurance-effective flag is turned on or when the insurance-effective flag is actually turned on, the main CPU 71 updates a counter for counting the number of times of playing an insurance-effective game, the counter being provided in the RAM 73 (step S95). The counter for counting the number of times of playing an insurance-effective game is equivalent to that for managing the number of times of playing a game played after the insurance-effective flag has been turned on, and in the processing of step S95, the number of times is added on a one-by-one basis. When this processing is performed, insurance-related processing is completed. On the other hand, the main CPU 71 completes insurance-related processing in the case where the insurance-effective flag is not turned on and a game is not performed on the MAX line.

Next, with reference to FIG. 16, symbol determination processing will be described. FIG. 16 is a view showing a flowchart of the symbol determination processing of a gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines anyone of the 22 symbols (code numbers from "00" to "21") as a to-be stopped symbol. At this time, each of the 22 symbols (code numbers from "00" to "21") is determined at an equal probability (i.e. 1/22).

Next, the main CPU 71 stores to-be stopped symbols of the determined video reels 3 in the symbol storage region provided in the RAM 73 (step S113). Next, with reference to a prize payment table (see FIG. 7), the main CPU 71 determines a winning combination, based on the symbol storage region (step S114). In this processing, the main CPU 71 determines whether or not a combination of the symbols displayed on the video reels 3, respectively, coincides with any one of those of the symbols specified in the prize payment table, and determines a winning combination. When this processing is performed, the symbol determination processing is completed.

Next, with reference to FIG. 17, number-of-payments determination processing will be described. FIG. 17 is a flowchart showing a subroutine of the number-of-payouts determination processing. First, the main CPU 71 determines whether or not a combination for jackpot execution has been established (step S151). In the case of determining that the combination for jackpot execution has not been established, the main CPU 71 determines the number of payouts corresponding to a prize (step S152). For example, three, four, or five "Q" symbols are displayed in a stopped state on a payline, 70, 140, or 280 coins are paid out (based on calculation per one coin insertion) (see FIG. 7). If a so called "losing" is established, "0" is determined as the number of payouts. Next, the main CPU 71 stores the determined number of payouts in the number-of-payout counter (step S153). When the processing is performed, the number-of-payout determination processing is completed.

Next, in the case of determining that a combination for jackpot execution has been established, the main CPU 71 notifies to the external control device 200 that a winning prize for jackpot has been established (step S154). Upon receipt of this notification, the external control device 200, which controls the plurality of gaming machine 1, transmits the amount of jackpot, which has been updated so far, to the gaming machines 1. At this time, with part of the amount of jackpot (80%, for example) being the subject of transmission, the remaining amount thereof may be carried over in preparation for the time of establishing a combination of the upcoming jackpot execution.

Next, the main CPU 71 receives the amount of jackpot from the external control device 200 (step S155). The main CPU 71 then stores the received amount of jackpot in the number-of-payouts counter (step S156). After the processing has been performed, the number-of-payouts determination processing is completed.

Next, with reference to FIG. 18, insurance-check processing will be described. FIG. 18 is a flowchart showing a subroutine of the insurance-check processing.

First, the main CPU 71 determines whether or not trigger symbols for free game have been displayed (step S160). In the case of determining that the trigger symbols for free game have been determined, the main CPU 71 conducts free-game processing (step S161). The free-game processing will be described below in detail, with reference to FIG. 20.

In the case of determining that a combination for free-game execution has not been established, the min CPU 71 determines whether or not an insurance-effective flag is turned on (step S162). When determining that the insurance-effective flag is not turned on, the main CPU 71 completes the insurance-check processing.

Next, in the case of determining that the insurance-effective flag is turned on, the main CPU 71 determines whether or not the number of times of playing an insurance-effective game is identical to a first threshold value (650 times, for example) (step S163).

In the case of determining the number of times of playing an insurance-effective game is identical to the first threshold value, the main CPU 71 activates a first insurance pay, based on a first payout value (see step S164 and FIG. 10A). In the embodiment, coins whose value corresponds to that obtained by multiplying an average multiplier in 1 to 650 games for the value corresponding to the first payout value determined in step S35 of FIG. 15 described previously are added to a current value of the number-of-credits counter. The average multiplier is obtained as follows. In the case where there are 50 MAX lines and the basic BET of the MAX lines is 25 BETs, if 50 BETs are continued in 1 to 650 games, the average number of BETs per Line becomes 2.000. Afterwards, a value (2.00) of the average multiplier is obtained by carrying the third place below a decimal point on average number of BETs per Line.

Next, in the case where the number of times of playing an insurance-effective game is not identical to the first threshold value, the main CPU 71 determines whether or not the number of times of playing an insurance-effective game is identical to a second threshold value (1,050 times, for example) (step S165). In this processing, in the case of determining that the number of times of playing an insurance-effective game is not identical to the second threshold value, the main CPU 71 completes insurance-check processing.

On the other hand, in the case of determining that the number of times of playing an insurance-effective game is identical to the second threshold value, the main CPU 71 activates a second insurance pay, based on the second payout value (see step S166 and FIG. 10B). In the embodiment, a value obtained by multiplying a value corresponding to the second payout value determined in step S94 of FIG. 15 described previously by that of an average multiplier in 1 to 1,050 games is added to a current value of the number-of-credits counter. For example, in the case where 50 BETs are placed in each of 1 to 650 games, and then, 25 BETs are placed in each of 651 to 1,050 games, an average number of BETs per Line is 1.619 . . . . This value is carried to the third place below a decimal point on the average number of BETs per Line, thus resulting in 1.62. The value obtained by multiplying the second payout value determined in step S94 of FIG. 15 is added to a current value of the number-of-credits counter.

Figure 20:
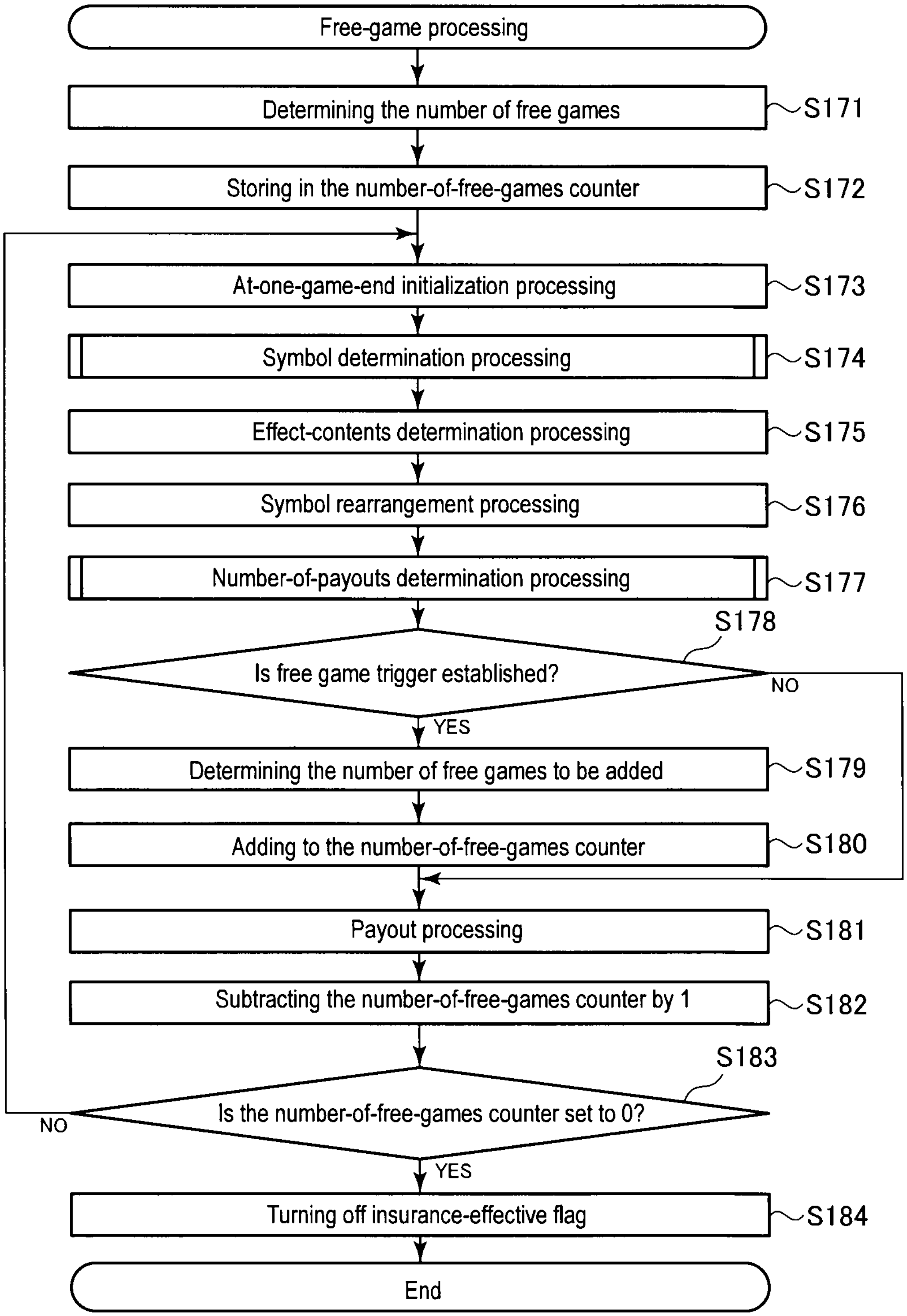
FIG. 20 is a flowchart showing a subroutine of free-game processing.

In steps S164 and S166, the payout of insurance is conducted based on a predetermined payout value, whereas this payout may be conducted during the play of a free game for the payout of insurance which is similar to that of the free game described below in FIG. 20. In this case, a value obtained by adding the amount of payout, which is conducted in a free game for the payout of insurance, to that determined in step S94 of FIG. 15, may be paid out as insurance, or alternatively, the payout of insurance in the amount of payout determined in step S94 in the free game for the payout of insurance may be conducted. Further, the above-obtained value may be multiplied by the value of the average multiplier.

Next, after a second insurance pay has been activated and in the case where a free game trigger is established on the MAX line, the main CPU 71 resets the number of times of playing an insurance-effective game (step S167). The main CPU 71 is then turned off an insurance effective flag (step S168). When this processing is performed, insurance-check processing is completed. The number of times of playing an insurance-effective game is reset when RAM resetting is performed as well.

Figure 19:
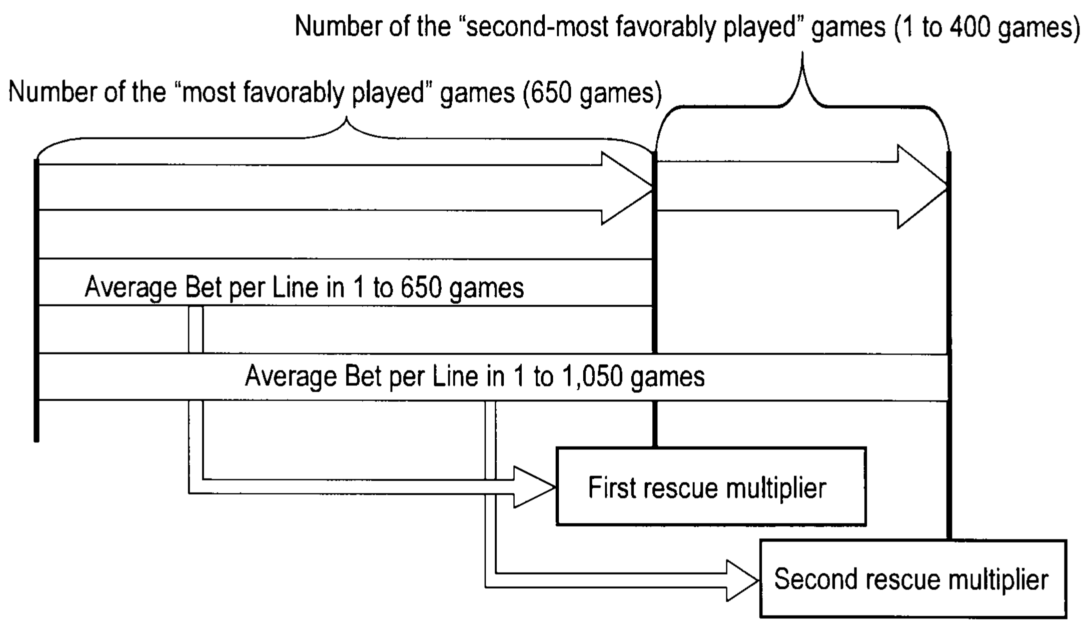
FIG. 19 is an explanative view of a multiplier.

FIG. 19 is intended to explain a multiplier as a method of paying out a plurality of insurances. As shown in FIG. 19, after an insurance effective flag has been turned on, this multiplier is obtained as described below, by using an accumulative total amount of BETs obtained until actuation of insurance which occurs after a predetermined number of games have been consumed.

First, an average number of BETs per Line is obtained. An accumulative total amount of BETs in a game, played on the MAX line until a predetermined number of games is consumed after the insurance-effective flag has been turned on, is divided by the predetermined number of games, and the average number of BETs per game is obtained. Further, the average number of BETs per game is divided by 25 which is the number of basic BETs on the MAX line, and the average number of BETs per LINE is obtained. This is formularized as: an average number of BETs per LINE=a total BET amount played on the MAX line until a predetermined number of games are consumed/(a predetermined number of games×25). A numeric value, leading up to the second place below a decimal point, is then obtained by carrying the third place below a decimal point on the finally obtained average number of BETs per LINE.

A value obtained by multiplying the multiplier calculated as described above for a total of (credit payment) and (free-game payment) is assigned to a player. The average number of BETs per LINE of the first insurance is calculated from an accumulative total amount of BETs in 1 to 650 games, assuming that a predetermined number of games are consumed from a first count-up. In addition, the average number of BETs per LINE of a second insurance is calculated from the accumulated total amount of BETs from the first count-up. This is not an accumulated total amount which is obtained until a predetermined number of games are consumed after the first insurance has been paid out.

Next, with reference to FIG. 20, free-game processing will be described. FIG. 20 is a flowchart showing a subroutine of the free-game processing. First, the main CPU 71 determined the number of free games (step S171). In the embodiment, a plurality of decimal numerals such as "50", "70", and "100", for example, are defined as the number of free games, and any of them is determined.

Next, the main CPU 71 stores the determined number of free games in a number-of-free-games counter provided in the RAM 73 (step S172).

Next, the main CPU 71 conducts at-one-game-end initialization processing (step S173), like the processing of step S23 shown in FIG. 12 described previously. The main CPU 71 then conducts the symbol determination processing shown in FIG. 16, described previously (step S174). The main CPU 71 then conducts effect-contents determination processing (step S175), like the processing of step S26 shown in FIG. 12, described previously. The main CPU 71 then conducts symbol rearrangement processing shown in step S27 of FIG. 12, described previously (step S176). The main CPU 71 then performs the number-of-payouts determination processing shown in FIG. 17, described previously (step S177).

Next, the main CPU 71 determines whether or not a combination for free-game execution has been established (step S178). When determining that the combination for free-game execution has been established, the main CPU 71 determines the number of free games to be added (step S179). In this step, the number of free games is determined like the processing of step S171 described previously. The main CPU 71 then adds the determined number of free games to a current value of the number-of-free-games counter (step S180).

Next, the main CPU 71 conducts payout processing (step S181). After the processing of step S180, or alternatively, when determining a combination for free game execution in step S178 has not been established, the main CPU 71 conducts payout processing. In this processing, the main CPU 71 adds the value of the number-of-payouts counter, which is stored in the number-of-payouts determination processing of step S177 described above, to a current value of the number-of-payouts counter for free game. The number-of-payouts counter for free game is for managing a total number of payouts determined in a free game.

When free-game processing has completed, the value stored in a number-of-payouts counter for free game is added to a current value of a number-of-credits counter provided in the RAM 73, in the payout processing of the step S30 of FIG. 12 described previously. Namely, a total number of payouts determined through a free game will be paid out in all. Coins may be discharged from a coin payout exit 15A, or alternatively, a ticket with a barcode may be issued.

Next, the main CPU 71 subtracts 1 from a current value of the number-of-free-games counter (step S182). The main CPU 71 then determines whether or not the number-of-free-games counter indicates 0 (step S183). When the main CPU 71 determines that the number-of-free-games counter does not indicate 0, the processing is shifted to step S173. On the other hand, when determining that the number-of-free-games counter indicates 0, the main CPU 71 turns the insurance-effective flag off. Afterwards, the free-game processing is completed.

Figure 21:
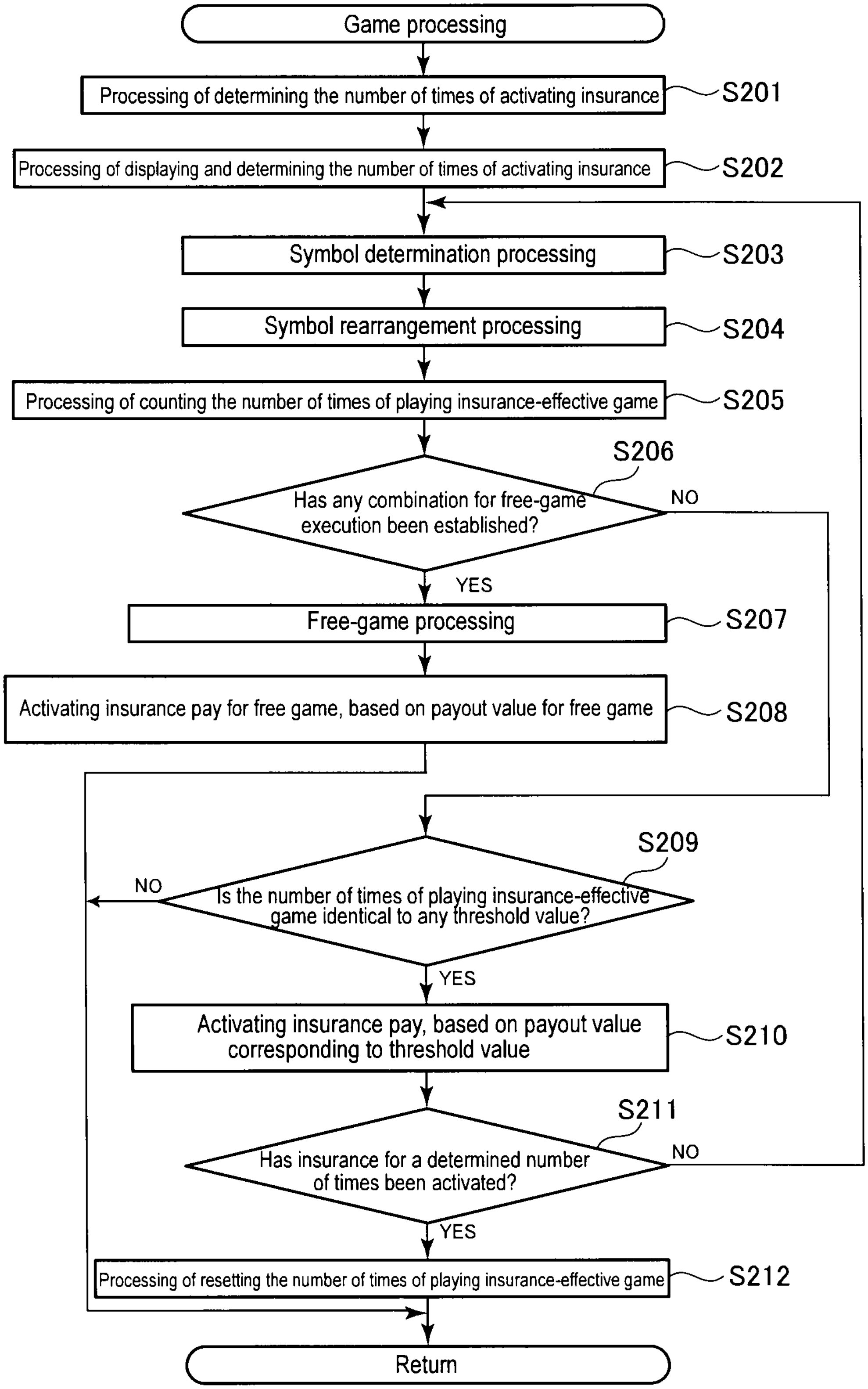
FIG. 21 is a flowchart showing a subroutine of game processing of a second example.

Next, with reference to FIGS. 21 to 23, a second example of the present invention will be described. FIG. 21 is a flowchart showing a subroutine of game processing of the second example. FIG. 22 is a view for explaining an insurance payout value for free game. FIG. 23 is a view for explaining the number of times of activating insurance and the insurance payout value in the second example. The game processing shown in FIG. 21 is different from that shown in FIG. 1 described previously in that: the number of times of activating insurance is randomly determined; the determined number of times of activating insurance is randomly displayed; and dedicated insurance is activated in the case where a free game is executed. In addition, the game processing shown in FIG. 21 is also different from that shown in FIG. 1 described previously in that resetting of an accumulative value related to activation of insurance is conducted only when all of the insurances whose number is randomly determined are executed. Hereinafter, with reference to FIG. 21, only substantial parts of the game processing will be described.

First, as shown in FIG. 21, in step S201, the main CPU 71 conducts processing of determining the number of times of activating insurance. In this processing, the main CPU 71 randomly determines the number of times of activating insurance, between 1 and 4 times, by employing random numbers.

Next, in step S202, the main CPU 71 conducts processing of displaying and determining the number of times of activating insurance. In this processing, the main CPU 71 randomly determines whether or not the number of times of activating insurance, which is determined in step S201, is to be displayed in an area of displaying the number of times of activating insurance, which is provided in the lower image display panel 141. In the case of determining that the number of times of activating insurance is displayed, the main CPU 71 displays the number of times of activating insurance in the area of displaying the number of times of activating insurance.

Next, in steps S203 to S207, the main CPU 71 conducts: symbol determination processing; symbol rearranging processing; processing of counting the number of times of playing an insurance-effective game; determination of whether or not a combination for executing a free game has been established; and free-game processing. The processing of these steps S203 to S207 is not described, since it is substantially identical to that of steps S2 to S6 shown in FIG. 1.

Next, after free-game processing has been conducted, the main CPU 71 activates an insurance pay for free game, based on a payout value for free game, in step S208. In this processing, the main CPU 71 conducts payout of insurance for free game, based on a payout value (100 in this example) of insurance for free game, shown in FIG. 22.

In the case of determining that a combination for executing a free game has not been established in step S206, the main CPU 71 determines whether or not the number of times of playing an insurance-effective game is identical to any threshold value in step S209. In this processing, the main CPU 71 determines whether or not the number of times of playing an insurance-effective game as an accumulative value has reached a threshold value associated with any insurance, based on a table listing the number of times of activating insurance and an insurance payout value, shown in FIG. 23, and the number of times of activating insurance, determined in step S201. For example, in the case of determining that the number of times of activating insurance is 3 times in step S201, the main CPU 71 determines whether or not the number of times of playing an insurance-effective game has reached any of the first, second, and third threshold values obtained when the first insurance, the second insurance, and the third insurance are activated, respectively.

Next, in step S210, the main CPU 71 activates an insurance pay, based on a payout value corresponding to a threshold value. In this processing, the main CPU 71 conducts payout of insurance whose amount is identical to the payout value of insurance corresponding to the threshold value that the number of times of playing an insurance-effective game has reached, based on the table shown in FIG. 23.

Next, in step S211, the main CPU 71 determines whether or not an insurance pay, the number of times of which was determined in step S201, is activated. If the determined number of insurance pays is not activated, the processing is shifted to step S203.

Alternatively, in the case where the predetermined number of insurance pays has been activated, the main CPU 71 conducts processing of resetting the number of times of playing an insurance-effective game, in step S212. The processing of step S212 is not described, since it is substantially identical to that of step S11 shown in FIG. 1.

Figure 24:
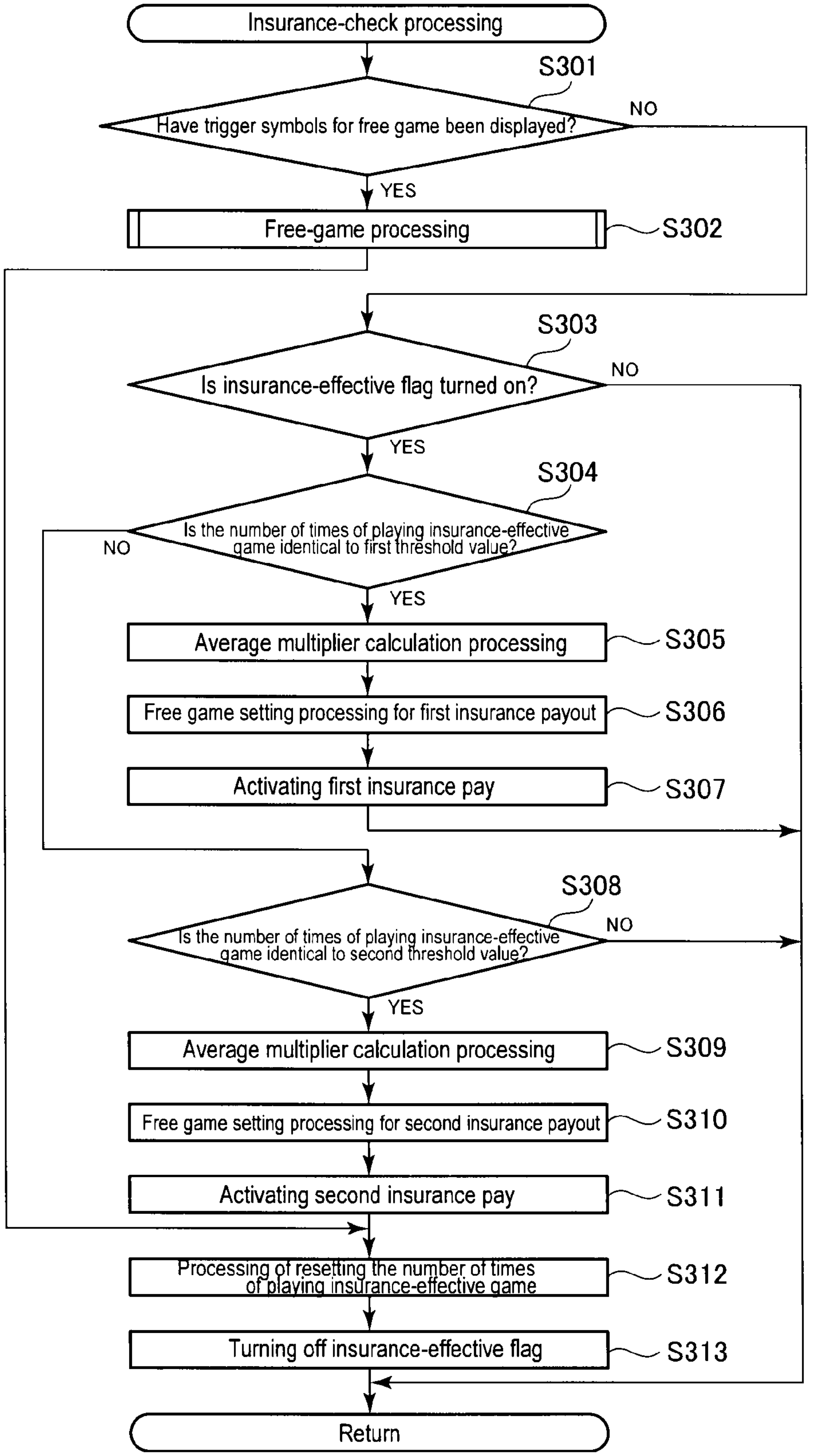
FIG. 24 is a view for explaining the insurance check processing in the third example.

Next, with reference to FIG. 24, a third example of the present invention will be described. FIG. 24 is a view showing insurance-check processing of the third example. In the insurance-check processing shown in FIG. 24, free games for payout of insurance are conducted as activations of the first insurance and the second insurance, whereas this processing is different from the game processing shown in FIG. 1 described previously in terms of change of reel(s) used in a free game for the payout of insurance or the fact that BET per Line is limited to 1 BET per Line. Hereinafter, only the substantial parts of the game processing with reference to FIG. 24 will be described.

First, in steps S301 to S304, the main CPU 71 conducts: determination of whether or not a trigger symbols for free game have been displayed; free-game processing; determination of whether or not an insurance-effective flag is turned on; and determination of whether or not the number of times of playing an insurance-effective game is identical to a first threshold value (650 times, for example). The processing of these steps S301 to S304 is not described, since it is substantially identical to that of steps S160 to S163 shown in FIG. 18.

Next, in the case where the number of times of playing an insurance-effective game is identical to the first threshold value, the main CPU 71 conducts average multiplier calculation processing (step S305). In this processing, an average multiplier of 1 to 650 games is obtained as in steps S164 of FIG. 18.

Next, the main CPU 71 conducts processing of setting a free game for payout of a first insurance (S306). In this processing, symbol arrangements of some of the reels used in a free game for the payout of insurance are changed so that more "Wild" symbols are included. Among a first video reel 3*a*, a second video reel 3*b*, a third video reel 3*c*, a fourth video reel 3*d*, and a fifth video reel 3*e*, "Wild" symbols are added to the first, second, and third video reels 3*a*, 3*b*, and 3*c*.

Next, in the case of determining that the number of times of playing an insurance-effective game is identical to the first threshold value, the main CPU 71 activates the first insurance pay (step S307). In this step, a value of the average multiplier, which is calculated in step S305, is multiplied by that obtained by adding the amount of payout of a free game for the payout of the first insurance to that of insurance of the first insurance determined in step S94 of FIG. 15. The payout whose amount is identical to the thus obtained value is conducted for a player.

In the case of determining that the number of times of playing an insurance-effective game is not identical to the first threshold value (step S304: No), the main CPU 71 determines whether or not the number of times of playing an insurance-effective game is identical to a second threshold value (1,050 times, for example) (step S308). In the case of determining that the number of times of playing an insurance-effective game is identical to the second threshold value (1,050 times, for example), the main CPU 71 conducts average multiplier calculation processing (step S309). An average multiplier of 1 to 1,050 games is obtained as in step S166 of FIG. 18.

Next, the main CPU 71 conducts processing for setting a free game for the payout of the second insurance (step S310).

In this processing, symbol arrangement of all of the reels that are used in a free game for the payout of insurance is changed so that more "Wild" symbols are included.

Next, the main CPU 71 activates a second insurance pay (step S311). In this processing, as in the above-described step S307, a value of the average multiplier calculated in step S309 is multiplied by that obtained by adding the amount of payout in a free game for the payout of the second insurance to that of the second insurance determined in step S94 of FIG. 15. The payout whose amount is identical to the thus obtained value is performed for a player.

Next, as in steps S167 and S168 shown in FIG. 18, in steps S312 and S313, the main CPU 71 resets the number of times of playing an insurance-effective game, is turned off an insurance-effective flag, and completes insurance-check processing.

Alternatively, in the case of determining that the number of times of playing an insurance-effective game is not identical to the second threshold value (1,050 times, for example) as well, the main CPU 71 completes insurance-check processing. At this time, insurance-check processing may be completed after the number of times of playing a game from the payout of the first insurance to that of the second insurance has been drawn by lottery after the completion of each unit game. This allows a player to expect that the payout of the second insurance may be performed earlier and to be entertained more. In this lottery, the number of times of playing a game after the payout of the first insurance and until the payout of the second insurance has been performed are randomly selected from among 1 to 400 times, and are stored so as to be serially updated in the RAM 73.

FIG. 25 is a view explaining in detail a free game of a two-stage rescue of a third example. As shown in FIG. 25, the gaming machine 1 executes a free game for the payout of insurance as a free game of the two-stage rescue. In this free game, prior to starting a free game, currently available reels are changed to those obtained by increasing a large number of "Wild" symbols to the video reels 3*a*, 3*b*, 3*c*, 3*d*, 3*e*. In addition, the current setting is changed to 1 BET per LINE, regardless of BET per LINE of a moment when a predetermined number of games have been consumed. The number of lines is 50 lines. A total number of "Win" symbols is multiplied by a multiplier after a free game for the payout of insurance has been completed. The behavior of the free game for the payout of insurance conforms to the specification similar to that of a normal free game.

Further, as shown in FIG. 25, the number of free games varies depending upon a first rescue and a second rescue. In the first rescue, a winning combination for the rescue is a free game; the number of games for the rescue is 650 times; a payout value pay (credit basic payment) leading up to the first insurance is 250 credits; among reels 1 to 5, reels 1 to 3 are those to which more "Wild" symbols are additionally assigned; and the number of times of playing a free game for the payout of insurance is 7 times. In the second rescue, a winning combination for the rescue is a free game, the number of games leading up to the rescue is 400 times; a rescue pay (credit basic payment) is 1,000 credits; all of reels 1 to 5 are those to which more "Wild" symbols are additionally assigned; and the number of times of playing a free game for the payout of insurance is 7 times.

Figure 26:
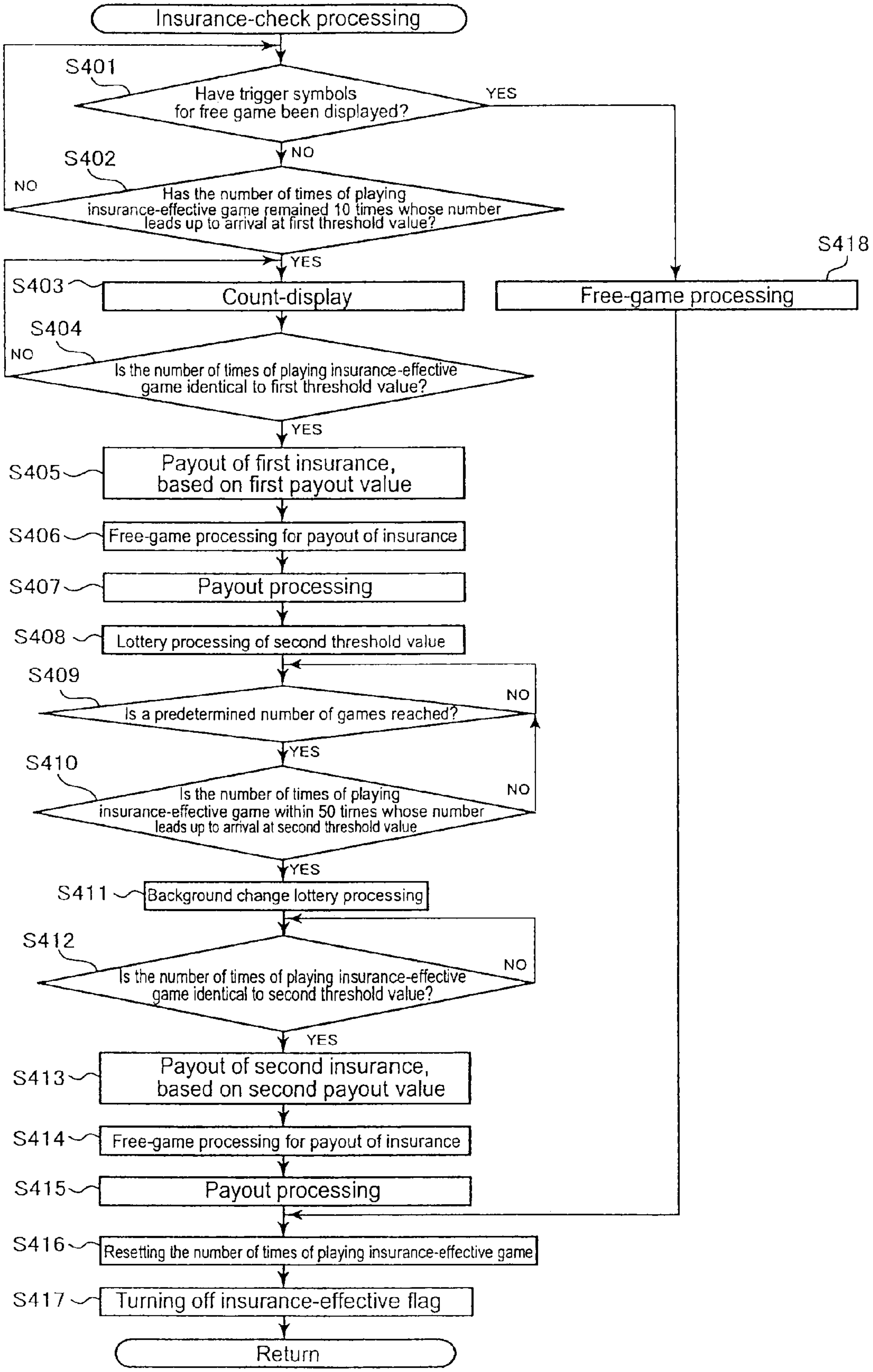
FIG. 26 is a flowchart showing game processing of a fourth example.

Next, with reference to FIGS. 26 to 36, a fourth embodiment will be described. FIG. 26 is a flowchart showing insurance-check processing of a fourth example. FIG. 27 is an explanatory view explaining a change of a display due to countdown. As shown in FIG. 28, a MAXBET button and an INFO area are displayed on the upper image display panel 131. In the embodiment, insurance automatically is turned on; and therefore, the MAXBET button always lights up. An RS touch button, a rescue meter, and a WIN meter are displayed on the lower image display panel 141. The RS touch button indicates a stage leading up to the payout of the first insurance or that leading up to the payout of the second insurance. Here, a stage "1$^{st}$ STAGE" leading up to the first insurance is displayed. In the case where the number of times of playing an insurance-effective game is not updated, since a game is not played on the MAX line, the RS touch button is displayed in grey. Further, in the case where the number of times of playing an insurance-effective game is updated after a game has been played on the MAX line, the updated fact is displayed in blue. On the rescue meter, the number of times obtained after a game has been played on the Max line and a value of an average multiplier are displayed. On the WIN meter, the amount of payout by unit game is displayed. In the embodiment, when a game is played on the MAX line, an insurance-effective flag is turned on. Therefore, an insurance BET button 37 shown in FIG. 5 is not needed, and when the MAXBET button displayed on the upper image display panel 131 shown in FIG. 28 is operated, the insurance-effective flag is turned on. Every time a game is played on the MAX line, a counter for counting the number of times of playing an insurance-effective game is updated. The insurance BET button 37 and the MAXBET button may be employed together in order to turn on the insurance-effective flag.

The main CPU 71 determines whether or not trigger symbols for free game have been displayed (step S401). In the case of determining that no trigger symbols for free game have been displayed, the main CPU determines whether or not the remaining number of times of playing an insurance-effective game, leading up to the first threshold value, is 10 times (step S402). Alternatively, in the case where it is determined that trigger symbols for free game have been displayed, free-game processing is performed (step S418). Afterwards, the number of times of playing an insurance-effective game is reset, and the insurance-effective flag is turned off (steps S416 and S417).

Figure 29:
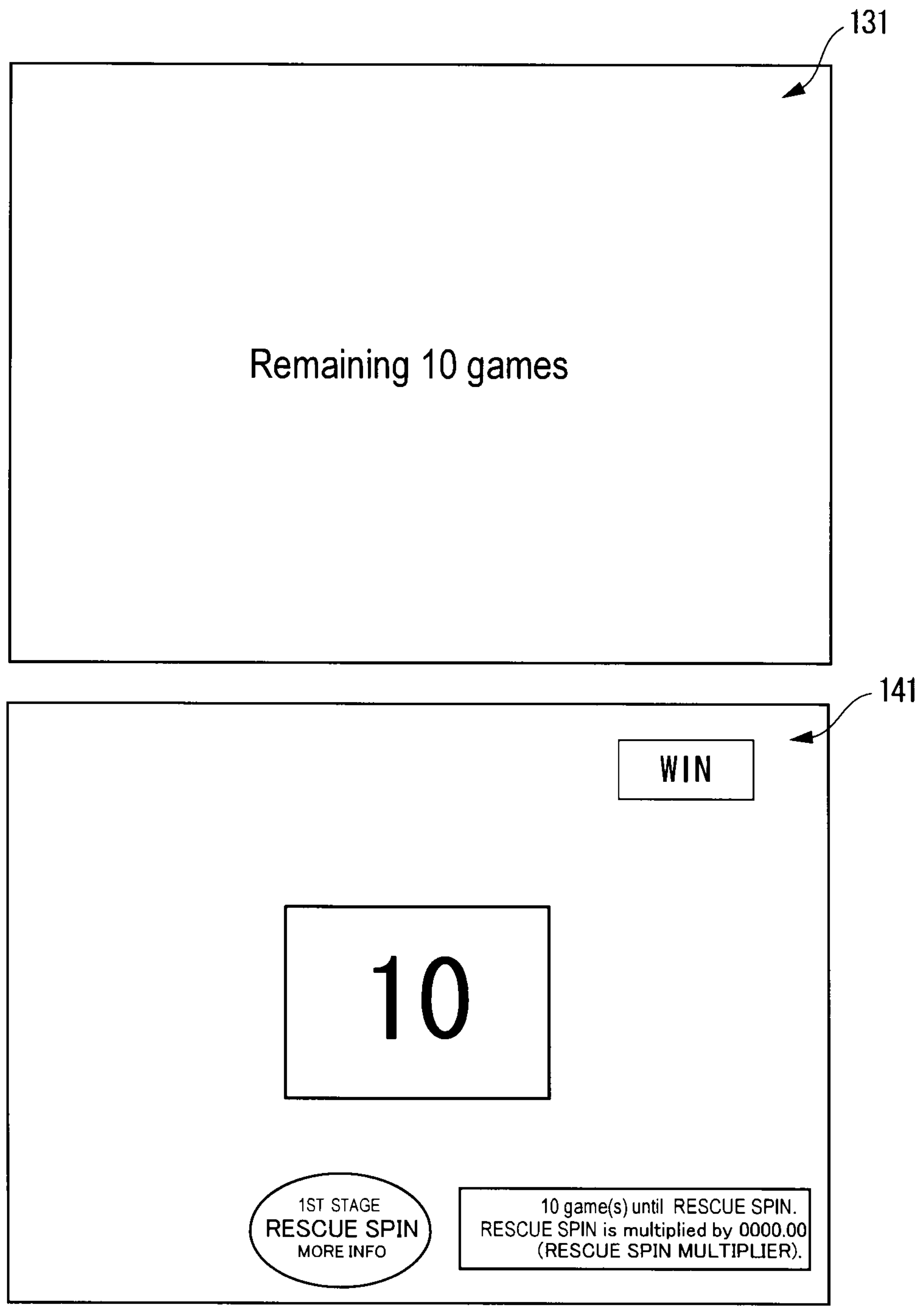
FIG. 29 is an explanatory view showing an example of display during countdown in the fourth example.
Figure 30:
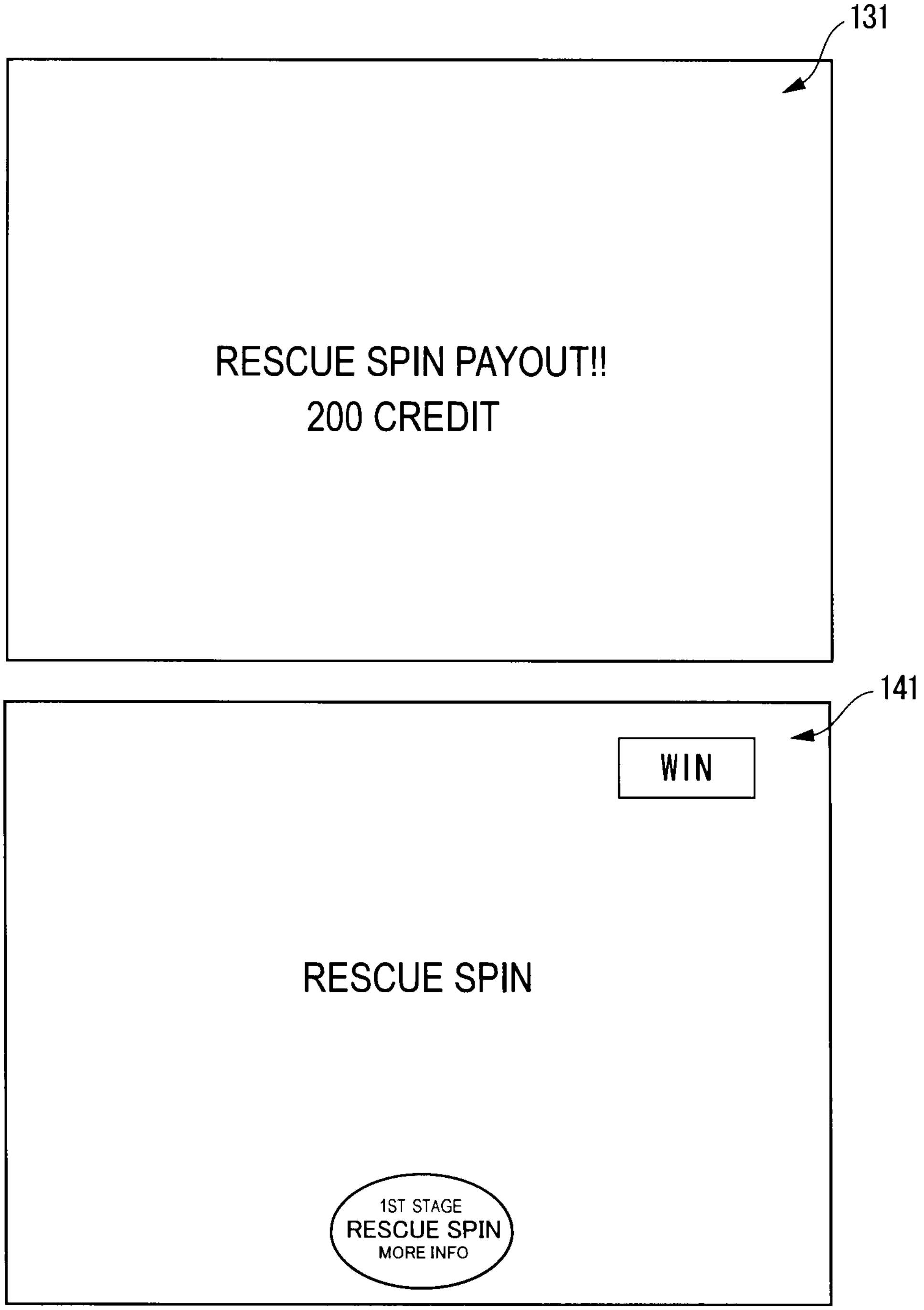
FIG. 30 is an explanatory view showing an example of display during first insurance payout.

Upon determining that the remaining number of times of playing an insurance-effective game, leading up to the first threshold value, is 10 times, the main CPU 71 conducts count-display (step S403). As shown in FIG. 29, when the remaining number of times of playing an insurance-effective game, leading up to the first threshold value of 650 times, is 10 times, i.e., after a 640-th game has completed, the upper image display panel 131 displays the fact that the first insurance is paid out after the remaining 10 games have been completed. Similarly, the lower image display panel 141 provides count-display. After count-display has been repeated, when it is determined that the number of times of playing an insurance-effective game has reached the first threshold value (step S404), the first insurance is paid out, based on the first payout value corresponding to a volume of the prize stored in the RAM 73 in association with the first threshold value (step S405). At this time, as shown in FIG. 30, the upper and lower image display panels 131 and 141 display the fact that the payout of the first insurance is performed.

Figure 31:
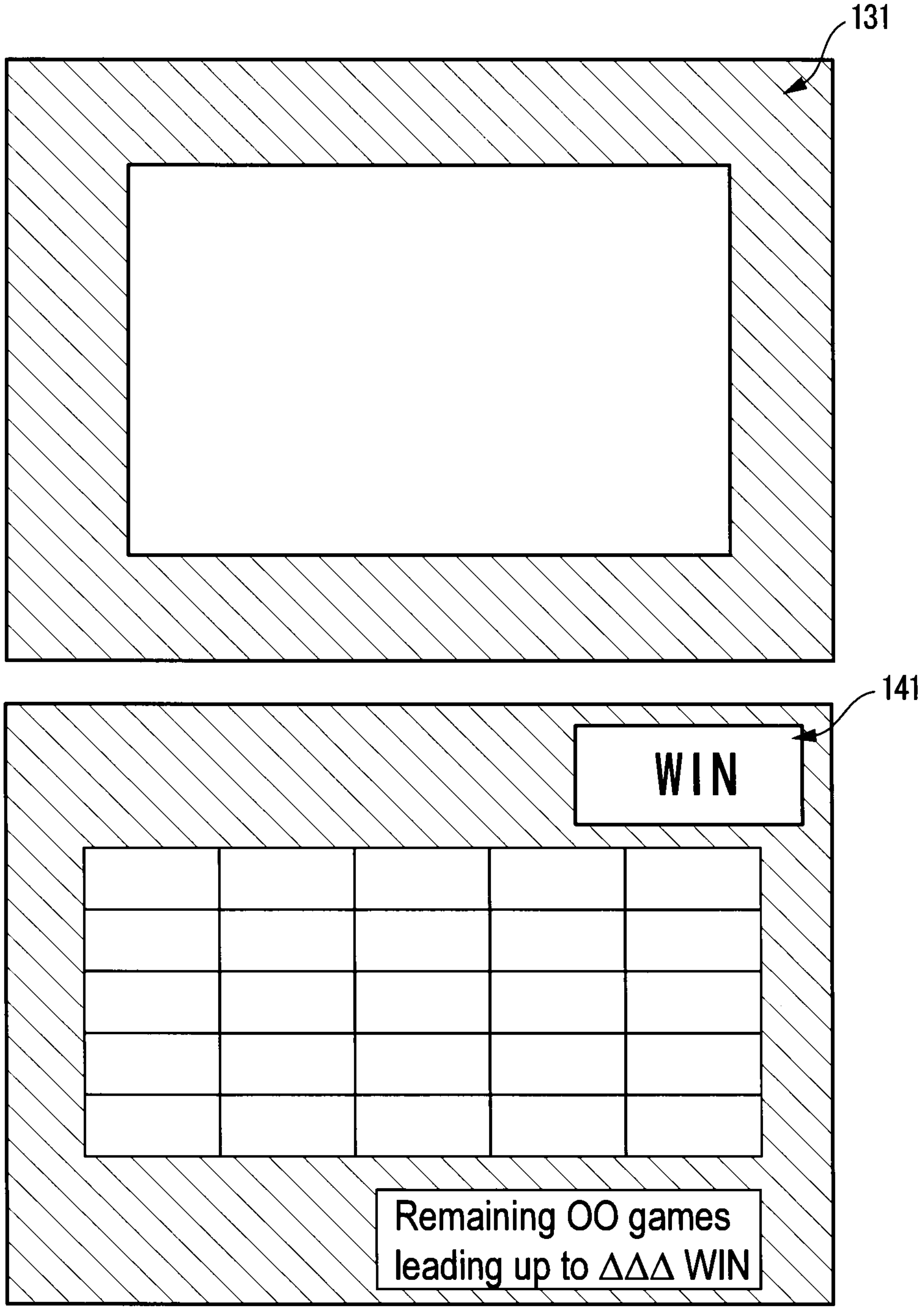
FIG. 31 is a view showing an example of display upon executing a free game for insurance payout.
Figure 32:
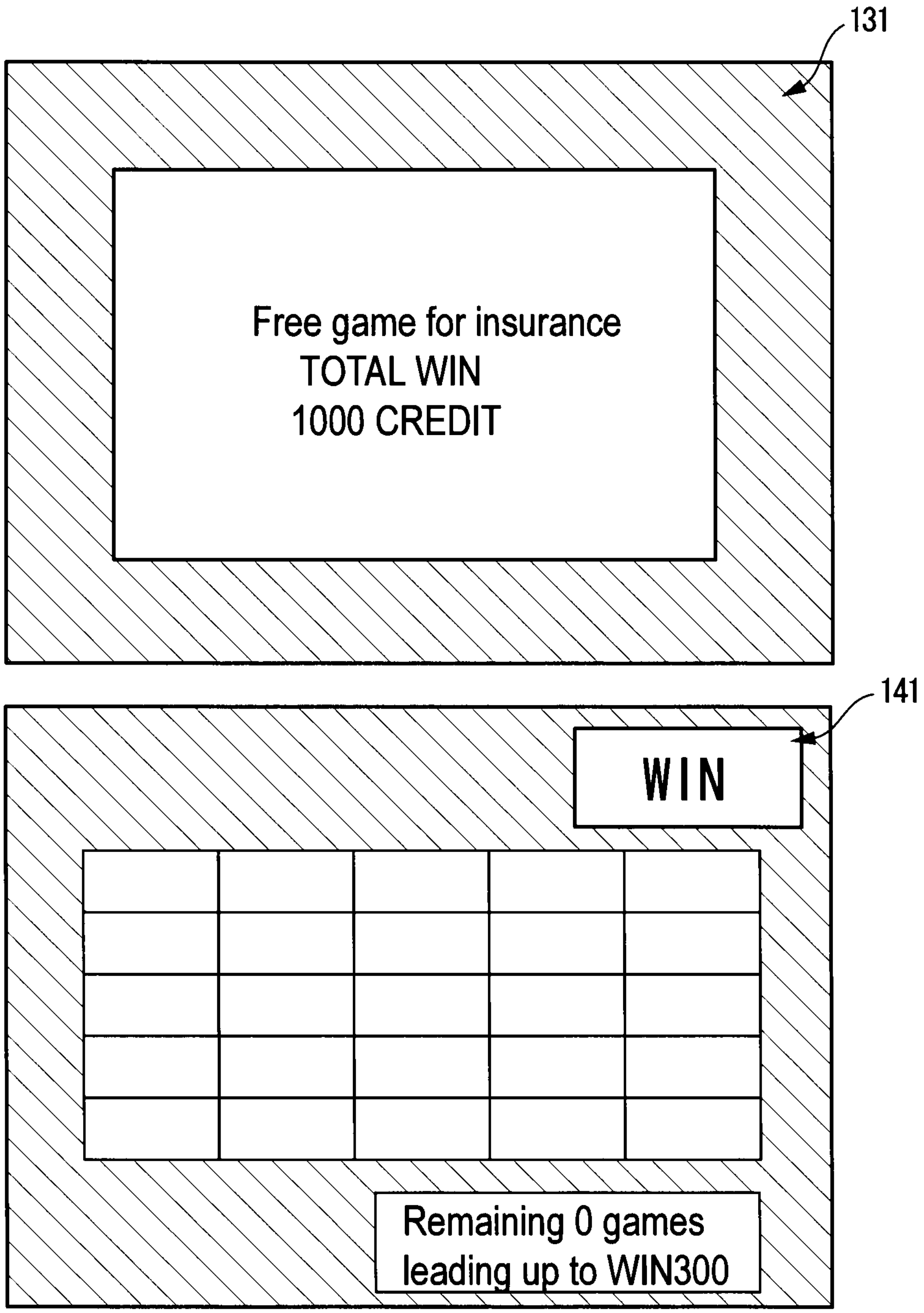
FIG. 32 is a view showing an example of display upon terminating a free game for insurance payout.

Next, when the payout of the first insurance has completed based on the first payout value, the main CPU 71 conducts a free game for the payout of insurance corresponding to the volume of prize stored in the RAM 73 in association with the first threshold value (step S406). As shown in FIG. 31, a display for free game for the payout of insurance is different from those for basic game, shown in FIGS. 28 to 30. The lower image display panel 141 displays a WIN meter which is highlighted as an RSWIN meter. The RSWIN meter displays the remaining number of times of playing a free game and the amount of payout accumulated in all of the free games. In addition, the WIN meter displays the amount of payment for each play of a free game. After a free game for the payout of insurance has completed, processing of the payout of insurance is performed, as in step S30 of FIG. 12 (step S407); and together with the payout of insurance, as shown in FIG. 32, the upper image display panel 131 displays a total amount of payout (1,000) which is obtained by multiplying a value of an average multiplier for that obtained by adding the amount of payout of the first insurance and that of a free game for the payout of insurance based on the first payout value. In addition, the RSWIN meter displayed on the lower image display panel 141 displays the fact that the remaining number of times of playing a free game is 0 times; and the amount of payout (300) paid out in all of the free games. Here is shown a case in which: the first insurance has been paid out; the amount of payout of the first insurance is 200; the amount of payout of a free game for the payout of insurance is 300; and the value of an average multiplier is 2.00.

Figure 27A:
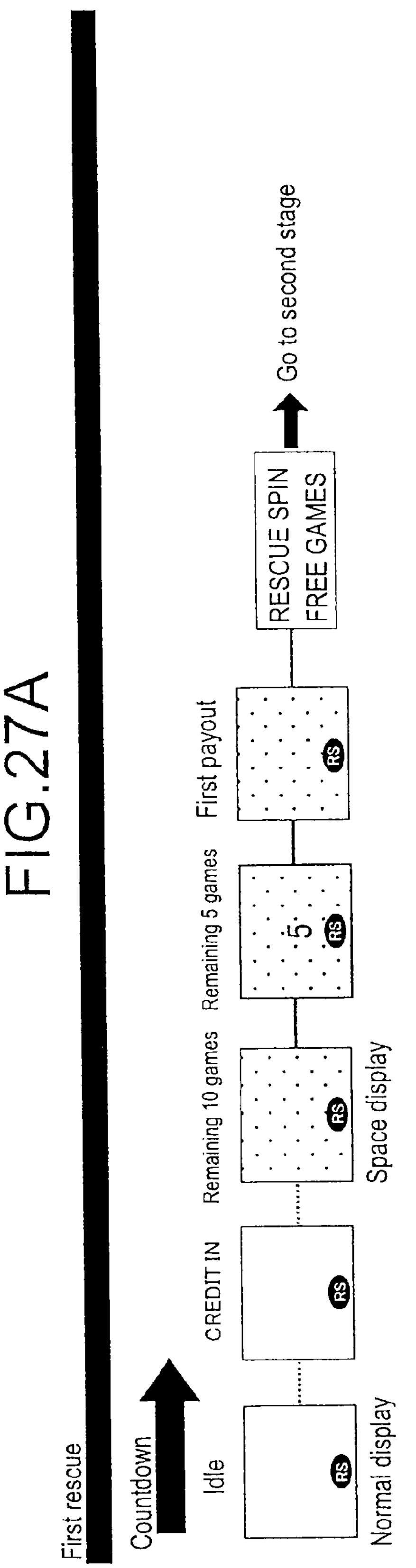
FIGS. 27A and 27B are views each explaining a change of a display due to countdown during normal operation in the fourth example.
Figure 28:
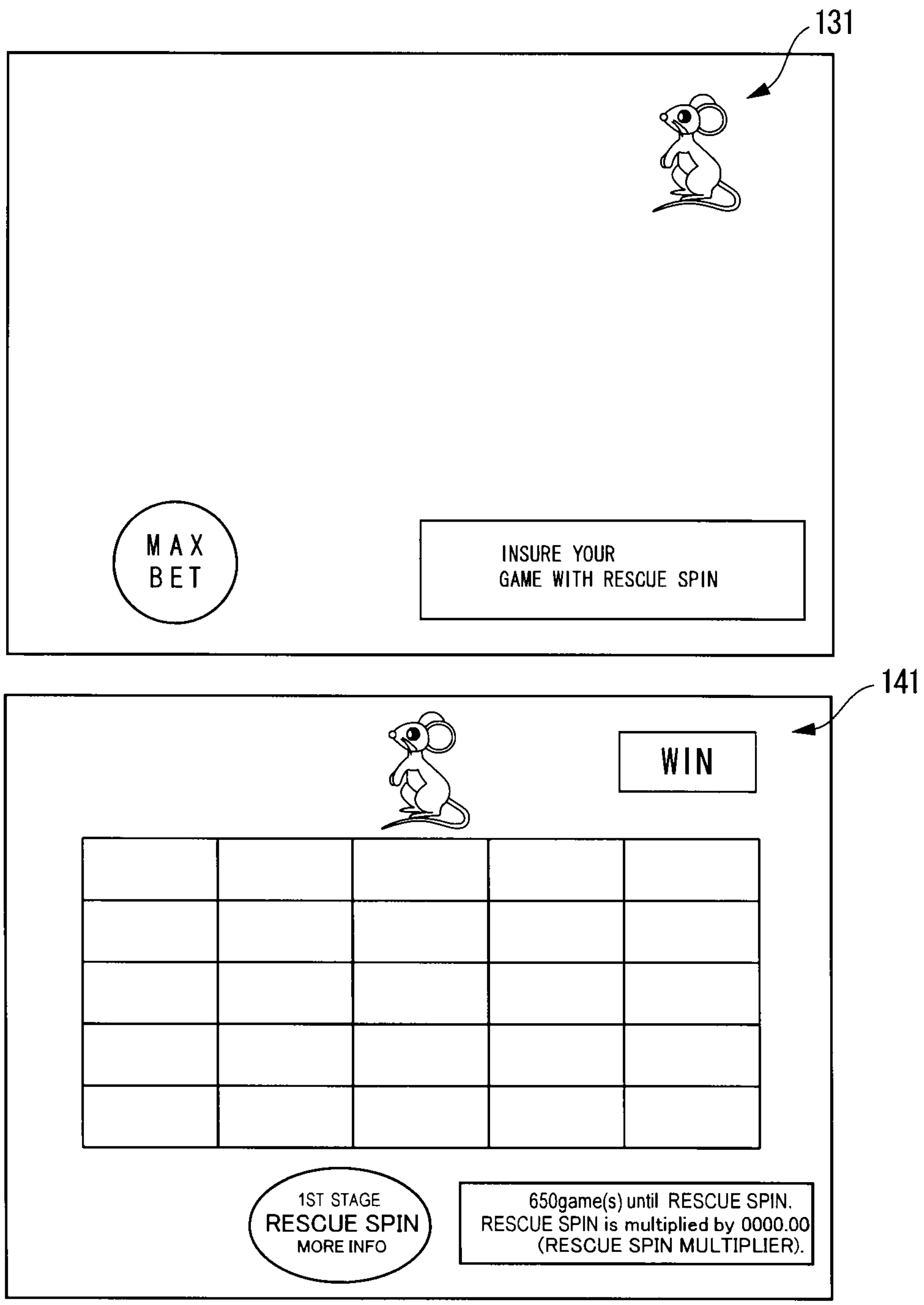
FIG. 28 is an explanatory view explaining an example of display during normal operation in the fourth example.

In the first stage leading up to the payout of the first insurance, a display is changed as shown in FIG. 27A. As shown in FIG. 27A, after a CREDIT IN image has been displayed, the counting is started, notifying to a player that the remaining number of times of playing an insurance-effective game, leading up to the first threshold value, is 10 times (see step S403); the currently displayed screen changes to space display; and when 0 is counted, a display is provided indicating that the first insurance is to be paid out. Afterwards, a display is provided indicating that a free game for the payout of insurance is to be performed.

Next, the main CPU 71 conducts a second threshold value to be drawn by lottery (step S408). In the case where the number of times of playing an insurance-effective game is a predetermined number, it is determined whether or not the remaining number of times, leading up to the second threshold value, reaches within 50 times (steps S409 and S410). In the case where the predetermined number of times is 50 times after a stage which the payout of the second insurance is to be performed has been started, i.e., in the case where the second threshold value is 980 times, and the first threshold value is 650 times, it is determined whether or not the remaining number of times has reached within 50 times up to the second threshold value when the 700-th, 750-th, 800-th, 850-th, 900-th, and 950-th games are performed.

In the case of determining the remaining number of times of playing an insurance-effective game, leading up to the second threshold value, reaches within 50 times (in the case where the 950-th game has been performed), the main CPU 71 conducts background change lottery processing (step S411). In respect of a background change, in the case where it is determined that the remaining number of times of playing an insurance-effective game, leading up to the second threshold value, is within 50 times, a background is changed at a predetermined rate (70%, for example). In this manner, the payout of the second insurance cannot be predicted, allowing a player to have expectation for the payout of the second insurance.

In the embodiment, in the case of background changing, as shown in FIG. 33, where the remaining number of times of playing an insurance-effective game, leading up to the second threshold value, reaches within 50 games, the upper and lower image display panels 131 and 141 display a cat animation character unlike FIG. 28. In addition, the color of background also changes (for example, the color/image indicating afternoon changes to that indicating evening). Only the color of background may be changed without any animation character change. In this manner, a player is aware of the fact that the payout of the second insurance is performed within 50 times, and increases the sense of expectation. In a stage leading up to arrival at the second threshold value (in the 651-th and subsequent games), a display "$2^{nd}$ STATION" is provided at an RS touch button. In addition, the layouts or display contents of a rescue meter also change, displaying the number of times played on the MAX line, the number of games played after a stage leading up to the second threshold value has been entered, and the value of an average multiplier leading from a time at which an insurance becomes effective (i.e., a first game) up to now. While the embodiment described determination of whether or not the remaining number of times leading up to arrival at the second threshold value reaches within 50 times every 50 times and change of background at a probability of 70%, the present invention does not limit the number of times and probability. In addition, background changing is not limited to the above descriptive matter. In the case where the remaining number of times leading up to arrival at the second threshold value reaches within 50 times, the fact may be notified to a player by mean of sound or light in place of a display.

Next, the main CPU 71 determines whether or not the number of times of playing an insurance-effective game is identical to the second threshold value (step S412). In the case where it is identical, this CPU pays out the second insurance, based on the second payout value corresponding to the volume of the prize stored in the RAM 73 in association with the second threshold value, and executes a free game for the payout of insurance corresponding to the volume of the prize stored in the RAM 73 in association with the second threshold value (steps S413 and S414). As in step S407, the payout of insurance is performed (step S415). Afterwards, the number of times of playing an insurance-effective game is reset, and an insurance-effective flag is turned off (steps S416 and S417). The number of times of playing an insurance-effective game is reset in the case where a free game trigger is established before the number of times of playing an insurance-effective game reaches the first or second threshold value, or alternatively, in the case where RAM resetting is performed as well.

In the embodiment, a display as to insurance is provided for a predetermined period of time, during insertion of the amount of money, after the number of times of playing an insurance-effective game has been reset after a free game trigger has been established, after the number of times of playing an insurance-effective game has been reset after the second insurance has been paid out, or alternatively, in the case where a touch panel is operated in an idle state. As shown in FIG. 34A, in a stage leading up to arrival at the first threshold value, in the case where a free game trigger has not been established until the number of games reaches 650 times, a display is provided indicating that: insurance whose amount is based on the first payout value is to be applied; and a free game for insurance is to be performed. In addition, as shown in FIG. 34B, in a stage leading up to arrival at the second threshold value, if no free game trigger has been established until the maximum number of games reaches a maximum of 1,050 times, a display is provided indicating that insurance whose amount is based on the second payout value is to be applied; and a free game for insurance is to be performed.

Figure 27B:
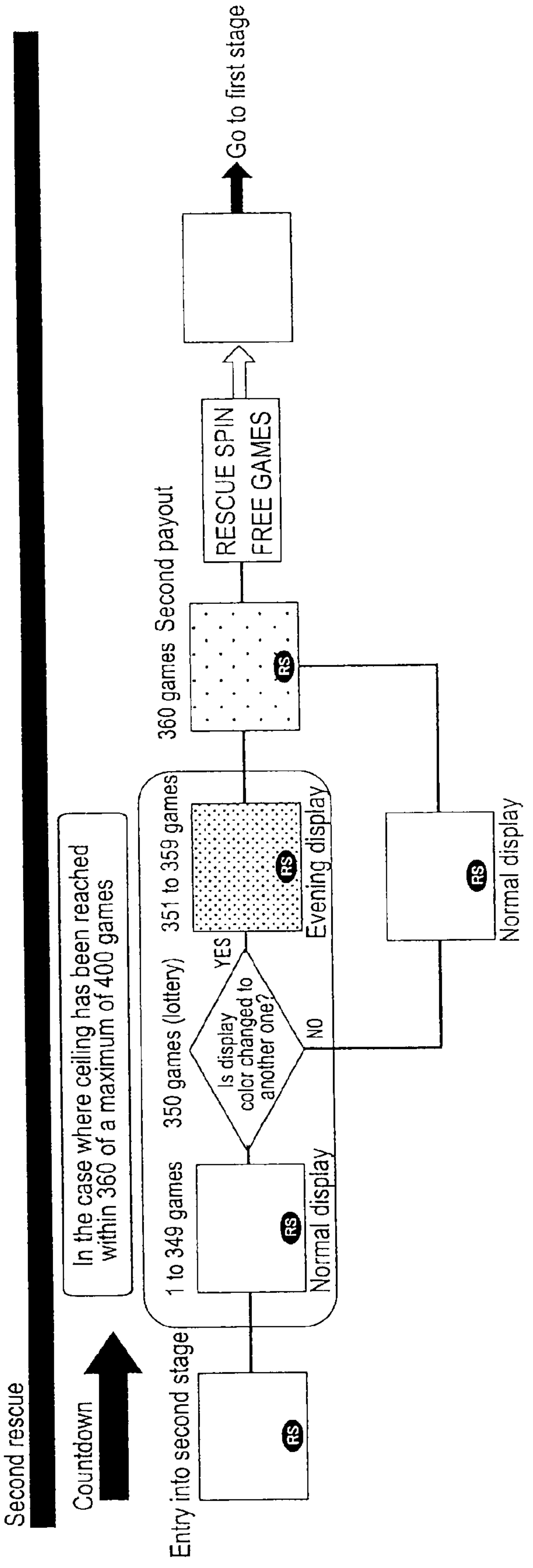

In the second stage leading up to the payout of the second insurance, a display is changed as shown in FIG. 27B. After a display has been provided indicating that the second stage has been entered, in the case where it is determined that the number of times of playing an insurance-effective game has reached the second threshold value within the remaining 50 times, lottery is performed as to whether or not the color of the screen is changed (see step S411). In the figure, it is shown that the second threshold value is reached when a 360-th game is performed after the second stage has been entered. Therefore, a 350-th game is performed when it is determined that the second threshold value is reached after the second stage has been entered. In the case where it is determined that the color of the screen is changed, the color of the screen is changed to the evening screen in the 351-th to 359-th games after the start of the second stage. Alternatively, in the case where it is determined that the color of the screen is not changed, the 351-th to 359-th games after the start of the second stage are performed without changing the color of the screen while a normal screen (afternoon display) is kept unchanged. Further, in the 360-th game after the start of the second stage, the display of the payout of the second insurance is provided. Afterwards, the display is provided indicating that a free game for the payout of insurance is to be performed; a free game for the payout of insurance is performed; the CREDIT IN screen of FIG. 27A is displayed, and the routine reverts to the first stage.

Figure 35A:
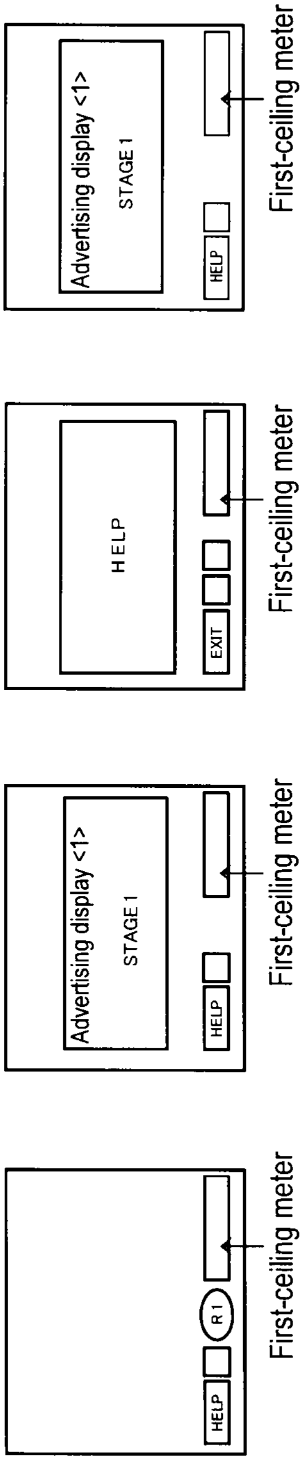
FIGS. 35A and 35B are explanatory views each showing a display format of a HELP image of insurance.
Figure 35B:
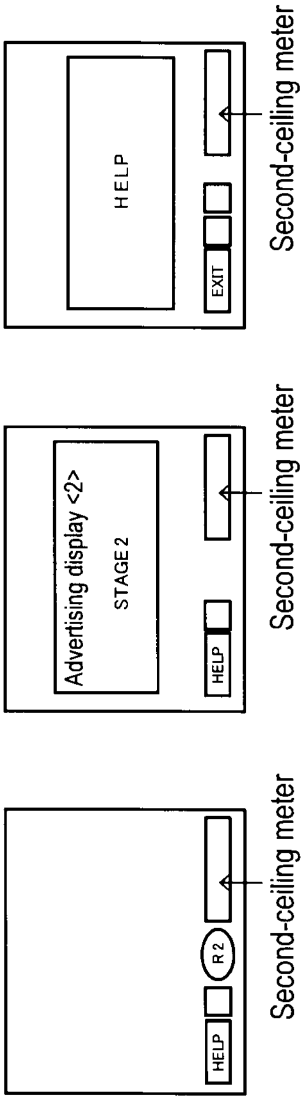

Further, as shown in FIG. 35A, in a stage leading up to arrival at the first threshold value, if an RS touch button is operated while the image of FIG. 34A is displayed, a HELP image shown in FIG. 36 is displayed. While the HELP image is displayed Page Up/Page Down is operated by means of BET buttons 34, 35. In the case where any other button (including a touch panel) has been operated or after a predetermined period of time has elapsed (after 3 minutes, for example), the image display of FIG. 34A is restored. Even in the case where no button operation is made, if a predetermined period of time is displayed, the immediately preceding display is restored. Similarly, as shown in FIG. 35B, in a stage which follows arrival at the first threshold value and leads up to arrival at the second threshold, the HELP image as shown in FIG. 36 is displayed for a predetermined period of time (3 minutes, for example) in the case where the RS touch button has been operated while the image of FIG. 34B has been displayed.

While the foregoing examples showed a case of displaying a total of 20 symbols of 5 columns×4 lines, the symbol display of the present invention is applicable to various display formats such as 3 columns×3 lines without being limitative thereto.

While the foregoing examples showed a case in which, if a game is performed on the MAX line, an insurance function automatically is turned on, the insurance function of the present invention may be employed as a configuration in which a player consumes a predetermined BET amount, and arbitrarily is turned on the insurance function.

While the foregoing examples showed a configuration of merely paying out the value obtained by multiplying the value of the average multiplier for the payout value of insurance or the amount of payout of a free game for the payout of insurance, a special prize may be awarded in the case where the value of the average multiplier is obtained as the maximum value. For example, the maximum value of the average multiplier becomes 20 in the case where: the number of games leading up to the payout of the first insurance is 750 times; the number of games leading up to the payout of the second insurance is 1,150 times; the number of MAX lines is 50 lines; the number of basic BETs on the MAX line is 25 BETs; and the maximum BET per Line is 20 BETs. In the case where 749 games are performed on BET per Line 20, and one game is performed on BET per Line 10, the average number of BETs per Line becomes 19.98666 . . . , and the maximum value of the average multiplier becomes 19.99. In this case, no special prize is awarded, since the maximum value does not reach 20. However, if all of the 751-th to 1,150-th games are performed on BET per Line 20, the average number of BETs per Line becomes 19.991 . . . , the average multiplier becomes 20, and thus, a special prize is determined to be awarded. As described above, by carrying an arbitrary number of digits below a decimal point, the value of the average multiplier is obtained as the maximum value, even if all of the games are not performed on the maximum BET per Line; and a special prize (a MAXBET free game) can be awarded, allowing a player to have the sense of expectation more. As a benefit for the fact that a feature game has been entered at the time of MAXBET, i.e., in a state in which the value of the multiplier is 20.00, a free game to be added through random lottery processing is set for the number of regular free games, and a MAXBET free game is then executed as a special prize. Therefore, a player is likely to perform MAXBET on his or her intention in order to obtain a prize in a MAXBET free game.

While the foregoing examples described scroll-display of symbols using a liquid crystal display device or the like, the present invention is applicable to use of mechanical reels, without being limitative thereto.

While the foregoing examples showed the payout of the insurance for free game based on the payout value for free game if a winning combination for executing a free game is established, the present invention is limitative thereto. After the payout of insurance, in the case where a game having made insurance effective a predetermined number of times or more has been played up to the play of the current game, the payout of insurance based on the second payout value may be performed.

While the foregoing examples showed the embodiment of a slot machine, the gaming machine according to the present invention is not limitative thereto. For example, it is applicable to various games such as a roulette game or a card game. In the case where it is applied to the roulette game, the number of games is counted on a game-by-game basis, and if the counted number of times has reached the number of times for the first game, a first insurance pay is executed, and if the counted number has reached that for the second game, a second insurance pay is executed. In the case where insurance has thus been made effective by a player, the payout of insurance is performed a plurality of times. Thus, a profit for insurance can be reliably provided to a player who has made insurance effective.

While the foregoing example showed that the threshold value associated with activation of an insurance pay is the number of games in which insurance has been made effective, the gaming machine according to the present invention is not limitative thereto. For example, the above threshold value may be a point value or the like to be determined according to a game result or the like of each unit game.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

What is claimed is:

1. A gaming machine comprising:

a display on which plural types of symbols are to be arranged;

a memory for storing a plurality of accumulative values, which are accumulated by unit game, to activate a plurality of insurance pays, and has a first threshold value and a second threshold value, and a volume of a prize of the insurance pays, which is stored in association with the first threshold value and the second threshold value of the accumulative value; and a controller, the controller being configured to execute the processing of:

(i) for every game routine in which the following processing operations (i) to (iii) are defined as one set of processing operations, randomly determining a predetermined number of times of insurance pay to be activated from among the plurality of insurance pays and then storing the randomly determined number of times in a counter;

(a) rearranging the plural types of symbols on the display;

(b) counting the accumulative value by said unit game and storing the counted accumulative value in the memory;

(c) determining whether the accumulative value stored in the memory has reached the first threshold value, as a result of repeating the processing (a) and (b)

(d) at the time it is determined in the processing (c) that the accumulative value has reached the first threshold value, and before (e), activating the first insurance pay in accordance with the volume of the prize stored in the memory in accordance with the first threshold value and then updating the counter;

(ii) in a case where a value of the counter indicating the number of times of activating the insurance pay that is randomly predetermined in the processing (i) is at least two or more, further executing the processing of:

(e) performing the processing (a);

(f) further counting the accumulative value by unit game, and then, storing the counted accumulative value in the memory;

(g) determining whether the accumulative value stored in the memory has reached the second threshold value, as a result of repeating the processing (e) and (f); and (h) at the time it is determined in the processing (g) that the accumulative value has reached the second threshold value, activating the second insurance pay in accordance with the volume of the prize stored in the memory in association with the second threshold value; and (iii) subsequently to the processing of activation of the insurance pay in the processing operations (i) to (iii), resetting the counter; and (iv) repeatedly executing the game routine in which the processing operations of (i) to (iii) are defined as one set of processing operations.

2. The gaming machine according to claim 1, further comprising a display portion for displaying the number of times of activating the plurality of insurance pays, wherein the controller is configured to further execute the processing of:

determining whether the number of times of activating the plurality of insurance pays is to be displayed at the display portion; and displaying or non-displaying the number of times of activating the plurality of insurance pays at the display portion in accordance with a result of the determination.

3. A control method of a gaming machine, according to claim 1, wherein the volume of the prize is stored in the memory in association with each of the insurance pays so as to increase in accordance with the number of times of activating the insurance pays.

* * * * *